(12) United States Patent
Tsutsumi et al.

(10) Patent No.: US 10,998,538 B2
(45) Date of Patent: May 4, 2021

(54) ENERGY STORAGE DEVICE, ENERGY STORAGE APPARATUS AND METHOD OF MANUFACTURING ENERGY STORAGE DEVICE

(71) Applicant: GS Yuasa International Ltd., Kyoto (JP)

(72) Inventors: Masakazu Tsutsumi, Kyoto (JP); Takuma Tonari, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 571 days.

(21) Appl. No.: 15/408,678

(22) Filed: Jan. 18, 2017

(65) Prior Publication Data

US 2017/0214030 A1 Jul. 27, 2017

(30) Foreign Application Priority Data

Jan. 21, 2016 (JP) .............................. JP2016-009849

(51) Int. Cl.
*H01M 2/30* (2006.01)
*H01M 2/06* (2006.01)
(Continued)

(52) U.S. Cl.
CPC .............. *H01M 2/30* (2013.01); *H01G 11/76* (2013.01); *H01G 11/80* (2013.01); *H01G 11/82* (2013.01);
(Continued)

(58) Field of Classification Search
None
See application file for complete search history.

(56) References Cited

U.S. PATENT DOCUMENTS 6,673,489 B2 1/2004 Fong et al.
2001/0004505 A1 6/2001 Kim et al.
(Continued)

FOREIGN PATENT DOCUMENTS

JP S 60-178969 U 11/1985
JP H 09-153351 A 6/1997
(Continued)

*Primary Examiner* — Zhongqing Wei
(74) *Attorney, Agent, or Firm* — McGinn I.P. Law Group, PLLC.

(57) ABSTRACT

A first projecting portion is disposed between a head portion of an external terminal and a gasket body of a gasket, the first projecting portion projecting toward the gasket body from a first opposedly-facing surface which opposedly faces a case of the head portion, the first projecting portion surrounding the shaft portion, the first projecting portion having a pressing surface which directly or indirectly presses the gasket body in a projecting direction of the first projecting portion. The gasket has the second and third opposedly-facing surfaces, the second opposedly-facing surface opposedly facing the head portion, the third opposedly-facing surface opposedly facing the case. A second projecting portion is disposed in a region of at least one of the second and third opposedly-facing surfaces which correspond to the first projecting portion, the second projecting portion surrounding the shaft portion and being in a state where the second projecting portion is compressed toward the second or third opposedly-facing surface by the pressing surface.

16 Claims, 13 Drawing Sheets

(51) Int. Cl.
*H01G 11/82* (2013.01)
*H01G 11/76* (2013.01)
*H01M 2/08* (2006.01)
*H01G 11/80* (2013.01)
*H01G 11/74* (2013.01)

(52) U.S. Cl.
CPC ............... *H01M 2/06* (2013.01); *H01M 2/08* (2013.01); *H01G 11/74* (2013.01)

(56) References Cited

U.S. PATENT DOCUMENTS

| | | | |
|---|---|---|---|
| 2003/0003355 A1* | 1/2003 | Ueda | H01M 2/0202 429/176 |
| 2003/0194609 A1 | 10/2003 | Nam et al. | |
| 2004/0086783 A1 | 5/2004 | Fong et al. | |
| 2004/0121230 A1* | 6/2004 | Fong | H01M 2/06 429/181 |
| 2010/0304214 A1 | 12/2010 | Itoh et al. | |
| 2011/0200870 A1* | 8/2011 | Kim | H01M 2/06 429/179 |
| 2012/0183845 A1* | 7/2012 | Kawamoto | H01M 2/305 429/179 |
| 2013/0177803 A1 | 7/2013 | Kugino et al. | |
| 2014/0315051 A1* | 10/2014 | Han | H01M 2/202 429/61 |
| 2015/0243955 A1 | 8/2015 | Kang | |

FOREIGN PATENT DOCUMENTS

| | | |
|---|---|---|
| JP | 2001-196047 A | 7/2001 |
| JP | 2003-317678 A | 11/2003 |
| JP | 2005-056648 A | 3/2005 |
| JP | 2009-181782 A | 8/2009 |
| JP | 2010-277936 A | 12/2010 |
| JP | 2011-165643 A | 8/2011 |
| JP | 2011-243559 A | 12/2011 |
| JP | 5652476 B | 11/2014 |
| JP | 2015-022936 A | 2/2015 |
| JP | 2016-091720 A | 5/2016 |
| JP | 2016-122604 A | 7/2016 |
| JP | 2015-162460 A | 9/2019 |

\* cited by examiner

ENERGY STORAGE DEVICE, ENERGY STORAGE APPARATUS AND METHOD OF MANUFACTURING ENERGY STORAGE DEVICE

CROSS-REFERENCE TO RELATED APPLICATION

This application claims the benefit of Japanese patent applications No. 2016-009849 filed on Jan. 21, 2016, which is incorporated by reference.

FIELD

The present invention relates to an energy storage device provided with external terminals, and a method of manufacturing the energy storage device.

BACKGROUND

Conventionally, there has been known a sealed battery which includes an electrode lead-out pin, and an insulating member disposed between the electrode lead-out pin and a metal plate (see JP 2009-181782 A). To be more specific, as shown in FIG. 16 to FIG. 18, the sealed battery is configured such that a header 104 which is formed by integrally mounting the insulating member and the electrode lead-out pin 103 on the metal plate 101 is mounted on an opening portion of a battery outer casing 105 by welding.

The insulating member is formed of; an outer insulating member 102A which faces an outer surface of the sealed battery 100; and an inner insulating member 102B positioned on an inner surface of the sealed battery 100. The header 104 is formed such that a columnar portion 1031 of the electrode lead-out pin 103 is made to pass through a hole formed in a center portion of the outer insulating member 102A, a conductive tab connecting plate 106 is disposed on the inner insulating member 102B disposed on an inner side of the metal plate 101, and a distal end of the columnar portion 1031 is caulked. The outer insulating member 102A has a plate-like portion 1021 having a pressure contact surface which is brought into contact with a head portion 1032 of the electrode lead-out pin 103, an upper projecting portion 1022 having an annular shape is formed around a hole formed in the plate-like portion 1021, and a lower large wall thickness portion 1023 having an annular shape is formed around the plate-like portion 1021 having a pressure contact surface which is brought into contact with the metal plate 101. The upper projecting portion 1022 and the lower large wall thickness portion 1023 formed on the outer insulating member 102A are compressed at the time of caulking the columnar portion 1031 of the electrode lead-out pin 103 so that it is possible to enhance gas tightness between the outer insulating member 102A and a member which is brought into contact with the outer insulating member 102A.

However, recently, in view of a use environment having a lot of vibrations such as an environment where the sealed battery 100 is mounted on a vehicle or the like, the sealed battery 100 is required to satisfy further enhancement of gas tightness between the electrode lead-out pin 103 and the metal plate 101.

SUMMARY

It is an object of the present invention to provide an energy storage device which is configured such that a gasket is disposed between an external terminal and a case and can enhance sealability between the external terminal and the case, and a method of manufacturing the energy storage device.

According to one aspect of the present invention, there is provided an energy storage device including:

a case;

an external terminal having a head portion disposed outside the case and a shaft portion extending from the head portion and penetrating the case; and a gasket having a gasket body disposed at least between the case and the head portion, wherein the head portion has a first opposedly-facing surface extending along an outer surface of the case and opposedly facing the gasket body, the gasket has second and third opposedly-facing surfaces, the second opposedly-facing surface opposedly facing the head portion, the third opposedly-facing surface opposedly facing the case, a first projecting portion is disposed between the head portion and the gasket body, the first projecting portion projecting toward the gasket body from the first opposedly-facing surface and surrounding the shaft portion, the first projecting portion having a pressing surface which directly or indirectly presses the gasket body in a projecting direction of the first projecting portion, and a second projecting portion is disposed in a region of at least one of the second and third opposedly-facing surfaces which correspond to the first projecting portion, the second projecting portion surrounding the shaft portion and being in a state where the second projecting portion is compressed toward the second or third opposedly-facing surface by the pressing surface.

DESCRIPTION OF EMBODIMENTS

Figure 1:
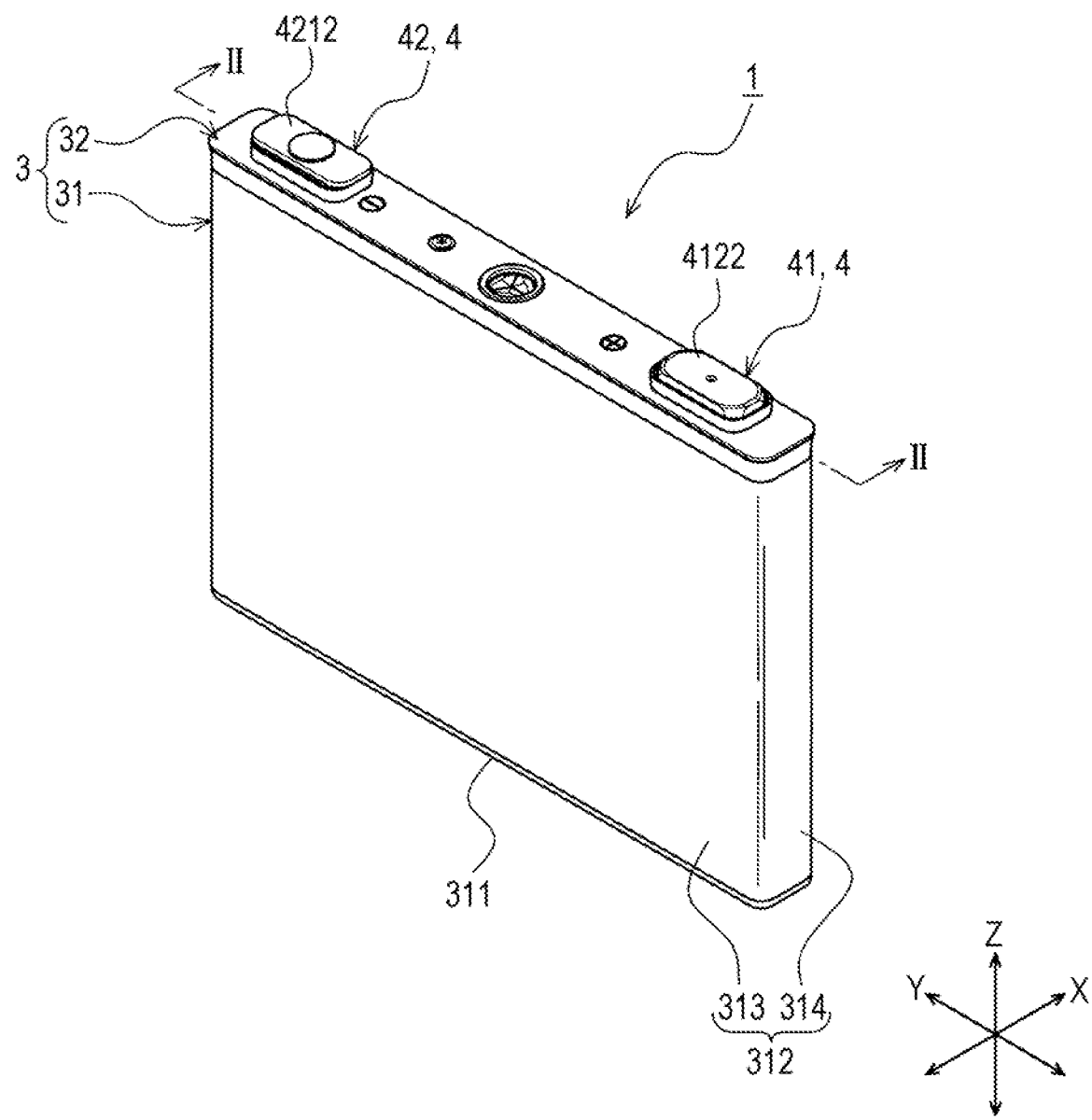
FIG. 1 is a perspective view of an energy storage device according to this embodiment.
Figure 2:
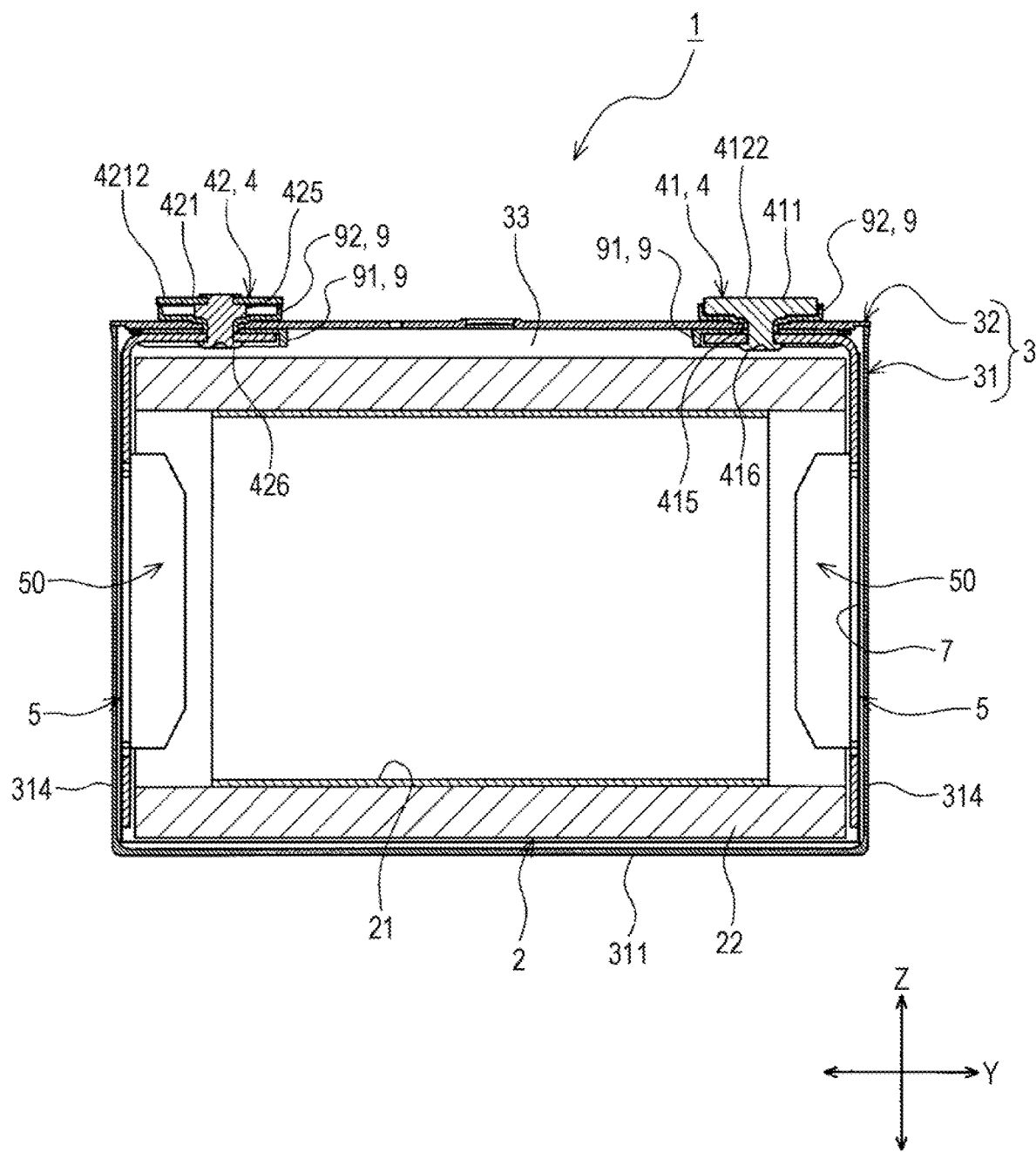
FIG. 2 is a cross-sectional view taken along a line II-II in FIG. 1.

According to one aspect of the present invention, there is provided an energy storage device including:

a case;

an external terminal having a head portion disposed outside the case and a shaft portion extending from the head portion and penetrating the case; and a gasket having a gasket body disposed at least between the case and the head portion, wherein the head portion has a first opposedly-facing surface extending along an outer surface of the case and opposedly facing the gasket body, the gasket has second and third opposedly-facing surfaces, the second opposedly-facing surface opposedly facing the head portion, the third opposedly-facing surface opposedly facing the case, a first projecting portion is disposed between the head portion and the gasket body, the first projecting portion projecting toward the gasket body from the first opposedly-facing surface and surrounding the shaft portion, the first projecting portion having a pressing surface which directly or indirectly presses the gasket body in a projecting direction of the first projecting portion, and a second projecting portion is disposed in a region of at least one of second and third opposedly-facing surfaces which correspond to the first projecting portion, the second projecting portion surrounding the shaft portion and being in a state where the second projecting portion is compressed toward the second or third opposedly-facing surface by the pressing surface.

With such a configuration, a force which presses the gasket toward the case generated by the head portion is concentrated on the pressing surface which projects from the first opposedly-facing surface and, at the same time, a force from the pressing surface is effectively applied to the second projecting portion in a compressed state brought about by the pressing surface. Accordingly, sufficient sealability can be ensured between the external terminal and the case (to be more specific, at least one (a side on which the second projecting portion is disposed) of between the first projecting portion and the second projecting portion and between the second projecting portion and the case).

In this case, in the energy storage device, it is preferable that the second projecting portion be in a state where the second projecting portion is collapsed by the pressing surface, and a projection area of the second projecting portion in a direction that the shaft portion extends be smaller than a projection area of the pressing surface in the direction that the shaft portion extends.

With such a configuration, in a state where a face pressure applied to the gasket by the first projecting portion from the pressing surface is enhanced in a region which surrounds the shaft portion, a region which surrounds the shaft portion and has a higher face pressure generated by the second projecting portion (the second projecting portion collapsed by the pressing surface) is partially formed in the region where the face pressure is increased and hence, sealability between the external terminal and the case is further enhanced.

In the energy storage device, the second projecting portion may be disposed on the second opposedly-facing surface and the third opposedly-facing surface of the gasket body.

With such a configuration, sufficient sealability can be ensured both of between the first projecting portion and the second projecting portion and between the second projecting portion and the case.

In the energy storage device, it is preferable that the first projecting portion be disposed adjacently to the shaft portion.

By disposing the first projecting portion adjacently to the shaft portion in this manner, a force pulled toward a case (gasket) side by the shaft portion is effectively transmitted to the first projecting portion and hence, sealability between the external terminal and the case can be further enhanced compared to a case where the first projecting portion is disposed at a position away from the shaft portion such as a position of an outer side (close to a peripheral edge) of the first opposedly-facing surface.

In the energy storage device, the head portion and the first projecting portion may be integrally formed with each other to construct a terminal head, and a thickness of the terminal head where the first projecting portion is formed in the direction that the shaft portion may be set larger than corresponding thicknesses of other portions of the terminal head.

With such a configuration, by setting the thickness of the terminal head at the portion where the first projecting portion is formed larger than the corresponding thicknesses of other portions of the terminal head, the thicknesses of other portions can be decreased while a strength of the first projecting portion (that is, a strength for pressing the gasket by the pressing surface) is ensured and hence, a size of the energy storage device (the size of the energy storage device in the direction that the shaft portion extends) can be suppressed.

In the energy storage device, the case may have a recessed portion indented toward an inside of the case on a peripheral edge portion around a hole through which the shaft portion is made to pass, an outer edge of the recessed portion may correspond to an outer edge of the first projecting portion as viewed from the direction that the shaft portion extends, and in the direction that the shaft portion extends, a distance between the pressing surface and a bottom portion of the recessed portion may be set smaller than a distance between the first opposedly-facing surface and an opposedly-facing surface of the case which opposedly faces the first opposedly-facing surface.

With such a configuration, while ensuring sealability between the external terminal and the case by sandwiching the gasket between the pressing surface of the first projecting portion and the bottom portion of the recessed portion, it is also possible to ensure sealability between the external terminal and the case at the position by sandwiching the gasket between the outer edge of the recessed portion and the outer edge of the first projecting portion and hence, sufficient sealability can be ensured with more certainty between the external terminal and the case.

In the energy storage device, a distance between the first oppposedly-facing surface and the opposedly-facing surface of the case which opposedly faces the first opposedly-facing surface may be larger than a thickness of the gasket body in the direction that the shaft portion extends, the gasket body positioned between the first opposedly-facing surface and the opposedly-facing surface of the case which opposedly faces the first opposedly-facing surface.

With such a configuration, a force which presses the gasket toward the case generated by the head portion is not transmitted (or minimally transmitted) to a portion of the gasket positioned between the first opposedly-facing surface and the opposedly-facing surface of the case which opposedly faces the first opposedly-facing surface and hence, such a pressing force is further concentrated on the pressing surface. As a result, sealability between the external terminal and the case can be further enhanced.

In the energy storage device, the external terminal may have, along an inner surface of the case, a large diameter portion extending from the shaft portion, the large diameter portion sandwiching, in the direction that the shaft portion extends, the gasket body and the case in cooperation with the first projecting portion, and the large diameter portion may expand to or outward of a position of the second projecting portion as viewed in the direction that the shaft portion extends.

With such a configuration, the gasket body and the case are sandwiched between the first projecting portion and the large diameter portion and hence, a pressing force by the first projecting portion (pressing surface) is effectively applied to the gasket body.

In the energy storage device, a region of the case which corresponds to the first projecting portion may be in a state where the region is hardened by working.

With such a configuration, the second projecting portion does not escape or minimally escapes toward a case side when the second projecting portion is pressed by the first projecting portion and hence, a pressing force by the first projecting portion is effectively applied to the second projecting portion.

In the energy storage device, the gasket body and the second projecting portion may be integrally formed with each other.

With such a configuration, a sealing state can be maintained between the gasket body and the second projecting portion with certainty.

According to another aspect of the present invention, there is provided an energy storage device including:

a case;

an external terminal having a head portion disposed outside the case and a shaft portion extending from the head portion and penetrating the case; and a gasket having a gasket body disposed at least between the case and the head portion, wherein the head portion has a first opposedly-facing surface extending along an outer surface of the case and opposedly facing the gasket body, the gasket has second and third opposedly-facing surface, the second opposedly-facing surface opposedly facing the head portion, the third opposedly-facing surface opposedly facing the case, a first projecting portion is disposed between the head portion and the gasket body, the first projecting portion projecting toward the gasket body from the first opposedly-facing surface and surrounding the shaft portion, the first projecting portion having a pressing surface which directly or indirectly presses the gasket body in a projecting direction of the first projecting portion, a second projecting portion is disposed in a region of at least one of the second and third opposedly-facing surface which correspond to the first projecting portion, in a state where the gasket body may not be compressed by the pressing surface, the second projecting portion is disposed in such a manner that the second projecting portion projects in a direction away from the gasket body and surrounds the shaft portion, and in a state where the gasket body is compressed by the pressing surface, the second projecting portion surrounding the shaft portion and being in a state where the second projecting portion is compressed toward the second or third opposedly-facing surface by the pressing surface.

With such a configuration, a force which presses the gasket toward the case generated by the head portion is concentrated on the pressing surface which projects from the first opposedly-facing surface and, at the same time, a force from the pressing surface is effectively applied to the second projecting portion in a compressed state brought about by the pressing surface. Accordingly, sufficient sealability can be ensured between the external terminal and the case (to be more specific, at least one (a side on which the second projecting portion is disposed) of between the first projecting portion and the second projecting portion and between the second projecting portion and the case).

According to another aspect of the present invention, there is provided a method of manufacturing an energy storage device including the steps of:

causing a shaft portion of an external terminal, which includes a head portion and the shaft portion extending from the head portion, to penetrate a case of the energy storage device such that a gasket body of a gasket is disposed between the head portion and the case, the gasket having second and third opposedly-facing surfaces, the second opposedly-facing surface opposedly facing the head portion, the third opposedly-facing surface opposedly facing the case;

forming a large diameter portion, which extends from the shaft portion along an inner surface of the case, by swaging a distal end portion of the shaft portion to sandwich the gasket body and the case between the first projecting portion and the large diameter portion;

disposing a first projecting portion between the head portion and the gasket body by causing the shaft portion to penetrate the case, the first projecting portion projecting toward the gasket body from a first opposedly-facing surface of the head portion which extends along an outer surface of the case and opposedly faces the gasket, the first projecting portion surrounding the shaft portion, the first projecting portion having a pressing surface which directly or indirectly presses the gasket body in a projecting direction of the first projecting portion;

disposing a second projecting portion in a region of at least one of the second and third opposedly-facing surfaces which correspond to the first projecting portion, the second projecting portion projecting in a direction away from the gasket body from at least one of the second and third opposedly-facing surface; and forming the large diameter portion to compress the second projecting portion by the pressing surface toward the second or third opposedly-facing surface.

With such a configuration, in the manufactured energy storage device, a force which presses the gasket toward the case generated by the head portion is concentrated on the pressing surface which projects from the first opposedly-facing surface and, at the same time, a force from the pressing surface is effectively applied to the second projecting portion in a compressed state brought about by the pressing surface. Accordingly, sufficient sealability can be ensured between the external terminal and the case (to be more specific, at least one (a side on which the second projecting portion is disposed) of between the first projecting portion and the second projecting portion and between the second projecting portion and the case).

As described above, according to the present invention, it is possible to provide an energy storage device which is configured such that a gasket is disposed between an external terminal and a case and can enhance sealability between the external terminal and the case, and a method of manufacturing the energy storage device.

Hereinafter, one embodiment of the present invention is described with reference to FIG. 1 to FIG. 9. Names of respective constitutional members (respective constitutional elements) used in the embodiment are exclusively for this embodiment, and may differ from names of respective constitutional members (respective constitutional elements) used in BACKGROUND.

An energy storage device may be a primary battery, a secondary battery, a capacitor or the like. In this embodiment, as one example of the energy storage device, a chargeable/dischargeable secondary battery is described.

The energy storage device of this embodiment is a non-aqueous electrolyte secondary battery. To be more specific, the energy storage device is a lithium ion secondary battery which makes use of the electron movement generated along with the movement of lithium ions. The energy storage device of this type supplies electrical energy. The energy storage device is used singly or in plural. To be more specific, when a required output and a required voltage are small, the energy storage device is used singly. On the other hand, when at least either one of a required output or a required voltage is large, the energy storage device is used in a form of an energy storage apparatus where the energy storage device is combined with other energy storage devices. In the energy storage apparatus, the energy storage device or the energy storage devices used in the energy storage apparatus supply electrical energy.

To be more specific, as shown in FIG. 1 to FIG. 4, the energy storage device includes: an electrode assembly 2; a case 3 which houses the electrode assembly 2 therein; external terminals 4 which are mounted on the case 3 in a state where the external terminals 4 are electrically conductive with the electrode assembly 2; and gaskets 9 each of which is disposed at least between the case 3 and the external terminal 4. In this embodiment, the gasket 9 includes an inner gasket 91 disposed in the inside of the case 3 and an outer gasket 92 having at least a portion thereof disposed outside the case 3. The energy storage device 1 also includes: current collectors 5 which make the electrode assembly 2 and the external terminals 4 electrically conductive with each other in the case 3; an insulating member 7 disposed between the electrode assembly 2 and the case 3 and the like.

Figure 4:
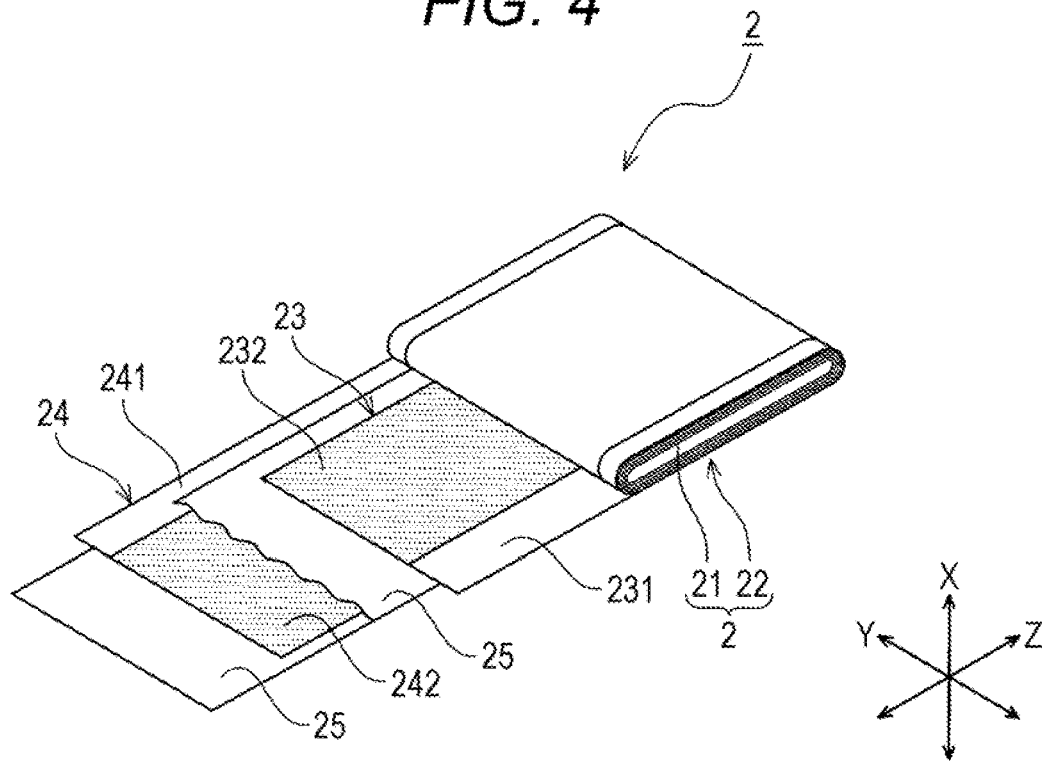
FIG. 4 is a perspective view of an electrode assembly of the energy storage device.

The electrode assembly 2 includes: a winding core 21; and a layered product 22 which is wound around the winding core 21 (see FIG. 4). The layered product 22 is formed by laminating a positive electrode 23 and a negative electrode 24 in a state where the positive electrode 23 and the negative electrode 24 are insulated from each other. In this electrode assembly 2, lithium ions move between the positive electrode 23 and the negative electrode 24 so that the energy storage device 1 charges/discharges electricity.

The positive electrode 23 includes: a metal foil 231 having a strip shape; and a positive active material layer 232 which is formed on the metal foil 231 in a state where a portion of the metal foil 231 (one end portion of the metal foil 231 in the width direction in an example of this embodiment) is exposed. The negative electrode 24 includes: a metal foil 241 having a strip shape; and a negative active material layer 242 which is formed on the metal foil 241 in a state where a portion of the metal foil 241 (the other end portion of the metal foil 241 in the width direction in the example of this embodiment) is exposed. In this embodiment, the electrode assembly 2 is formed by winding the positive electrode 23 and the negative electrode 24 in a state where the positive electrode 23 and the negative electrode 24 are insulated from each other by a separator 25 having a strip shape.

The case 3 includes: a case body 31 having an opening; and a lid plate 32 which closes (seals) the opening of the case body 31.

The case 3 is formed by joining an opening peripheral edge portion 34 of the case body 31 (see FIG. 3) and a peripheral edge portion of the lid plate 32 to each other in an overlapping state. The case 3 has an inner space 33 defined by the case body 31 and the lid plate 32 (see FIG. 2). The case 3 stores an electrolyte solution in the inner space 33 together with the electrode assembly 2, the current collectors 5 and the like. Accordingly, the case 3 is made of metal having resistance against the electrolyte solution.

The case body 31 includes: a plate-like closed portion 311; and a cylindrical barrel portion 312 which is connected to a peripheral edge of the closed portion 311.

The closed portion 311 is a portion which is positioned at a lower end of the case body 31 when the case body 31 is disposed with the opening directed upward. That is, the closed portion 311 is a portion which forms a bottom wall of the case body 31 when the case body 31 is disposed with the opening directed upward. The closed portion 311 has a plate shape having a rectangular profile. In the description made hereinafter, assume the short side direction of the closed portion 311 as the X axis direction in an orthogonal coordinate system, the long side direction of the closed portion 311 as the Y axis direction in the orthogonal coordinate system, and the normal direction of the closed portion 311 as the Z axis direction in the orthogonal coordinate system. Orthogonal coordinate axes which respectively correspond to the X axis direction, the Y axis direction and the Z axis direction are described auxiliary in the respective drawings.

The barrel portion 312 has a prismatic cylindrical shape which conforms to a profile of the closed portion 311 and, in more detail, the barrel portion 312 has a flat prismatic cylindrical shape. To be more specific, the barrel portion 312 includes: a pair of long wall portions 313 extending along long sides of a peripheral edge of the closed portion 311; and a pair of short wall portions 314 extending along short sides of the peripheral edge of the closed portion 311. One end of the barrel portion 312 is closed by the closed portion 311, and the other end of the barrel portion 312 is opened. That is, the case body 31 has a flat bottomed prismatic cylindrical shape.

The lid plate 32 is a plate-like member which closes the opening of the case body 31. To be more specific, the lid plate 32 has a profile which corresponds to the opening peripheral edge portion 34 of the case body 310 as viewed in the Z axis direction. In this embodiment, the pair of external terminals 4 is mounted on the lid plate 32 in a state where the external terminals 4 are electrically connected (conductive) to respective electrodes (a positive electrode and a negative electrode) of the electrode assembly 2.

As also shown in FIG. 5 to FIG. 8, a pair of through holes (holes) 322 which makes the inside and the outside of the case 3 communicate with each other is formed in the lid plate 32. The through holes 322 are used for making the electrode assembly 2 housed in the case 3 and the external terminals 4 electrically conductive with each other. To be more specific, the through holes 322 penetrate the lid plate 32 in the Z axis direction (thickness direction). The through holes 322 are formed in both end portions of the lid plate 32 in the Y axis direction. That is, the pair of through holes 322 is formed in the lid plate 32 in a spaced-apart manner in the Y axis direction. A portion of the external terminal 4 is made to pass through each through hole 322.

In this embodiment, recessed portions 321 which are indented toward an inner surface side from an outer surface side are formed on the lid plate 32, and the through hole 322 is disposed in each recessed portion 321. That is, the lid plate 32 has the recessed portions 321 each of which is indented toward the inside of the case 3 at a peripheral edge portion around the through hole 322. The recessed portion 321 includes: a bottom portion 3211 expanding in the X-Y plane direction; and a peripheral surface portion 3212 raised from a peripheral edge of the bottom portion 3211. In this embodiment, the recessed portion 321 has a circular shape (circular profile) as viewed in the Z axis direction, and the circular through hole 322 is disposed at a center portion of the recessed portion 321.

The external terminals 4 are portions which are electrically connected to external terminals of other energy storage devices, external equipment or the like. The external terminals 4 are made of a material having conductivity. For example, an external terminal 41 of a positive electrode (hereinafter also referred to as "positive electrode external terminal") is made of aluminum or an aluminum-based metal material such as an aluminum alloy. An external terminal 42 of a negative electrode (hereinafter also referred to as "negative electrode external terminal") is made of copper or a copper-based metal material such as a copper alloy and an aluminum-based metal material.

Figure 3:
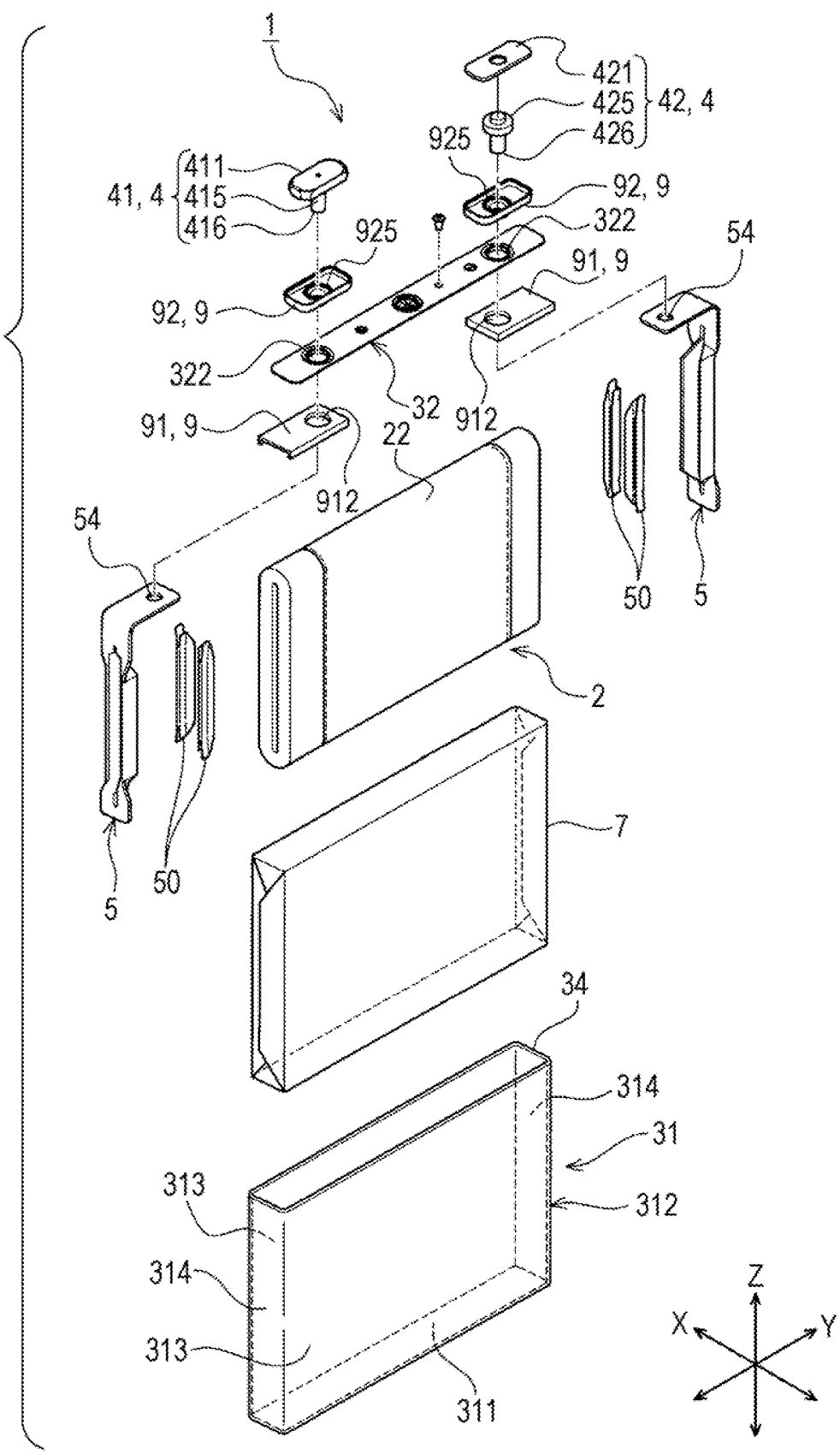
FIG. 3 is an exploded perspective view of the energy storage device.
Figure 6:
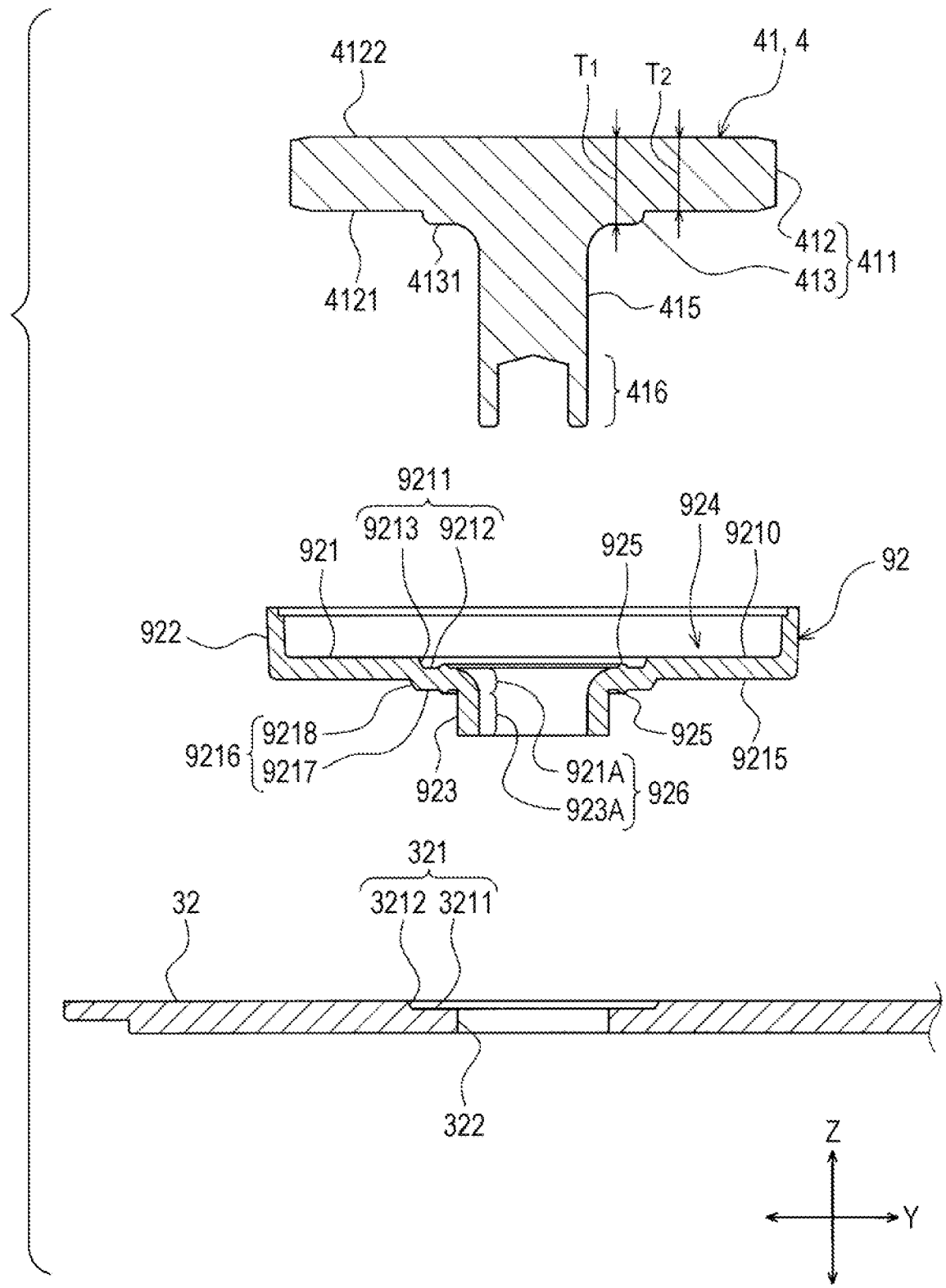
FIG. 6 is a view for describing the positive electrode external terminal, an outer gasket, a through hole formed in a lid plate and an area around the through hole.
Figure 7:
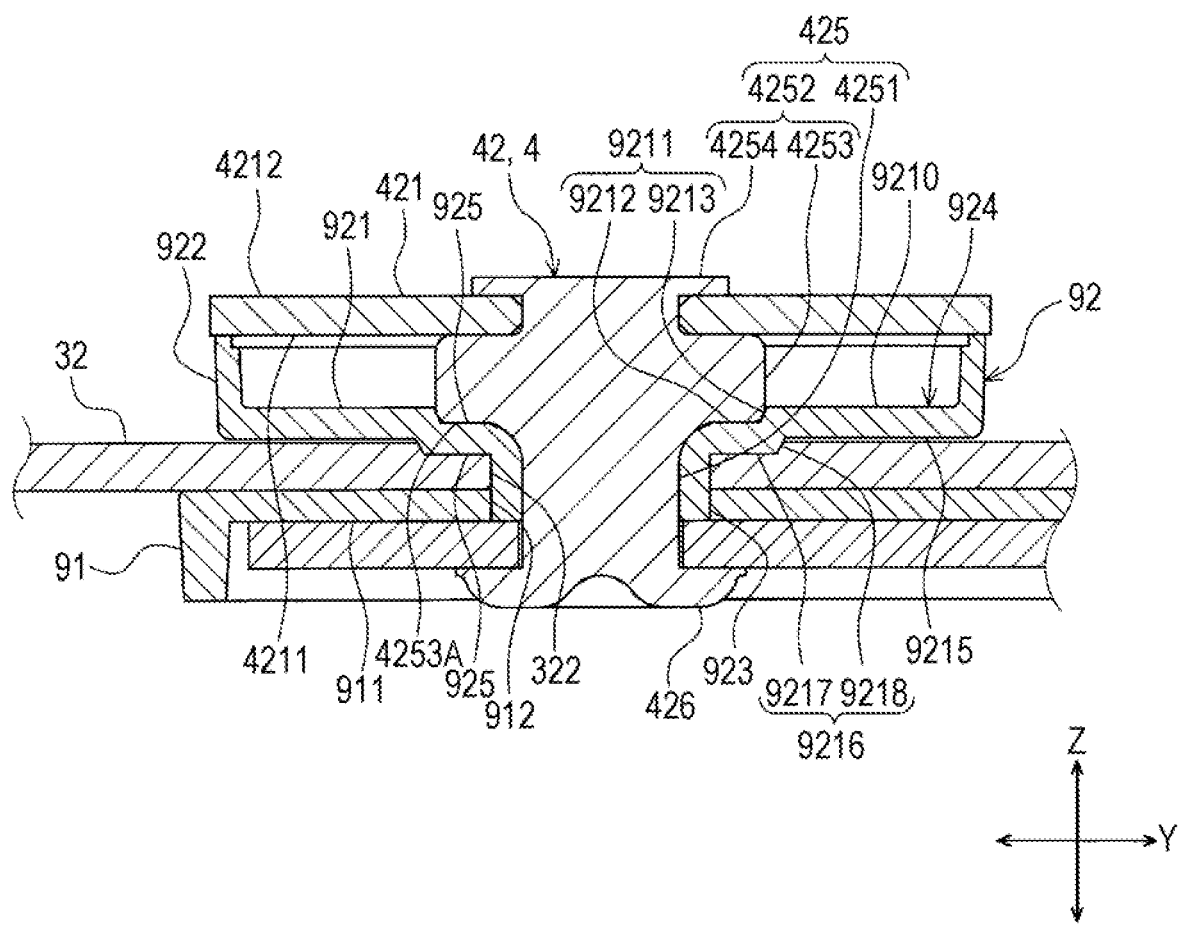
FIG. 7 is an enlarged cross-sectional view of a negative electrode external terminal and an area around the negative electrode external terminal.

The positive electrode external terminal 41 has: a terminal head 411 disposed outside the case 3; and a shaft portion 415 which extends from the terminal head 411 and penetrates the lid plate 32 (case 3). The positive electrode external terminal 41 also has a large diameter portion 416 expanding from the shaft portion 415 along an inner surface of the case 3. The positive electrode external terminal 41 in this embodiment is configured such that the terminal head 411, the shaft portion 415 and the large diameter portion 416 are formed as an integral body. FIG. 3 and FIG. 6 show the large diameter portion 416 before the large diameter portion 416 is caulked.

The terminal head 411 is a plate-like portion. In this embodiment, the terminal head 411 is a plate-like portion having a rectangular shape as viewed in the Z axis direction. The terminal head 411 has: a head body (head portion) 412 expanding along the lid plate 32 (case 3); and a first projecting portion 413 projecting from the head body 412 toward the case 3.

The head body 412 has a first opposedly-facing surface 4121 which expands along the outer surface of the lid plate 32 (case 3) and oppposedly faces the outer gasket 92. The head body 412 also has a connection surface 4122 to which a bus bar or the like is connected by welding or the like on a side opposite to the first opposedly-facing surface 4121. In this embodiment, the connection surface 4122 has a flat shape.

The first projecting portion 413 projects toward an outer gasket 92 (lid plate 32) side between the head body 412 and the lid plate 32 (case 3) from the first opposedly-facing surface 4121 and surrounds the shaft portion 415 (extends in the circumferential direction of the shaft portion 415). The first projecting portion 413 has a pressing surface (contact surface) 4131 which presses the outer gasket 92 at a distal end thereof in the projecting direction (a lower side in FIG. 5 and FIG. 6). The first projecting portion 413 is disposed adjacently to the shaft portion 415. In this embodiment, the pressing surface 4131 expands along an X-Y plane from the shaft portion 415 and has a circular profile as viewed in the Z axis direction. That is, in this embodiment, the pressing surface 4131 has a straight-line shaped cross section taken along a plane including the Z axis (see FIG. 5 and FIG. 6) and an annular shape as viewed in the Z axis direction. An outer edge of the first projecting portion 413 (pressing surface 4131) corresponds to an outer edge (peripheral surface portion 3212) of the recessed portion 321 of the lid plate 32. To be more specific, a diameter (outer diameter) of the first projecting portion 413 is smaller than a diameter (inner diameter) of the recessed portion 321. The difference in diameter between the first projecting portion 413 and the recessed portion 321 is set based on a thickness or the like of the outer gasket 92. A projection amount of the first projecting portion 413 from the first opposedly-facing surface 4121 is set such that a distance α between the pressing surface 4131 and the bottom portion 3211 of the recessed portion 321 is smaller than a distance β between the first opposedly-facing surface 4121 and an outer surface of the lid plate 32 (the outer surface of the lid plate 32 outside the recessed portion 321) which opposedly faces the first opposedly-facing surface 4121 (see FIG. 5).

In the terminal head 411 having the above-mentioned configuration, a thickness (a size in the Z axis direction) $T_1$ of a portion where the first projecting portion 413 is formed is set larger than a thickness $T_2$ of other portions (see FIG. 6).

The shaft portion 415 makes the current collector 5 disposed in the case 3 and the terminal head 411 disposed outside the case 3 electrically conductive with each other. The shaft portion 415 passes through the through hole 322 formed in the lid plate 32 and extends from the terminal head 411 (head body 412) to the inside of the case 3. In this embodiment, the shaft portion 415 is a columnar (to be more specific, a circular columnar) portion extending in the Z axis direction.

The large diameter portion 416 sandwiches the outer gasket 92 and the lid plate 32 (case 3) in cooperation with the terminal head 411 (to be more specific, the first projecting portion 413). To be more specific, the large diameter portion 416 expands in the X-Y plane direction from the shaft portion 415, and sandwiches the outer gasket 92, the lid plate 32, the inner gasket 91 and the current collector 5 in the Z axis direction in cooperation with the terminal head 411. With such a configuration, on a positive electrode external terminal 41 side, the positive electrode external terminal 41, the outer gasket 92, the inner gasket 91 and the current collector 5 are fixed to the lid plate 32. The large diameter portion 416 expands to the position where a second projecting portion 925 of the outer gasket 92 described later is formed or to an area outside this position (see FIG. 5). In this embodiment, the large diameter portion 416 is formed in the following manner. In a state shown in FIG. 6, the shaft portion 415 is made to pass through a through hole 926 formed in the outer gasket 92 (the through hole 322 formed in the lid plate 32), a through hole 912 formed in the inner gasket 91, and the through hole 54 formed in the current collector 5. In such a state, a circular cylindrical portion (a portion indicated by symbol 416 in FIG. 6) extending to a distal end side of the shaft portion 415 and being exposed to the inside of the case 3 is caulked. Due to such caulking, the positive electrode external terminal 41 and the current collector 5 can be brought into sufficient contact with each other so that the positive electrode external terminal 41 and the current collector 5 are made electrically conductive with each other.

Figure 8:
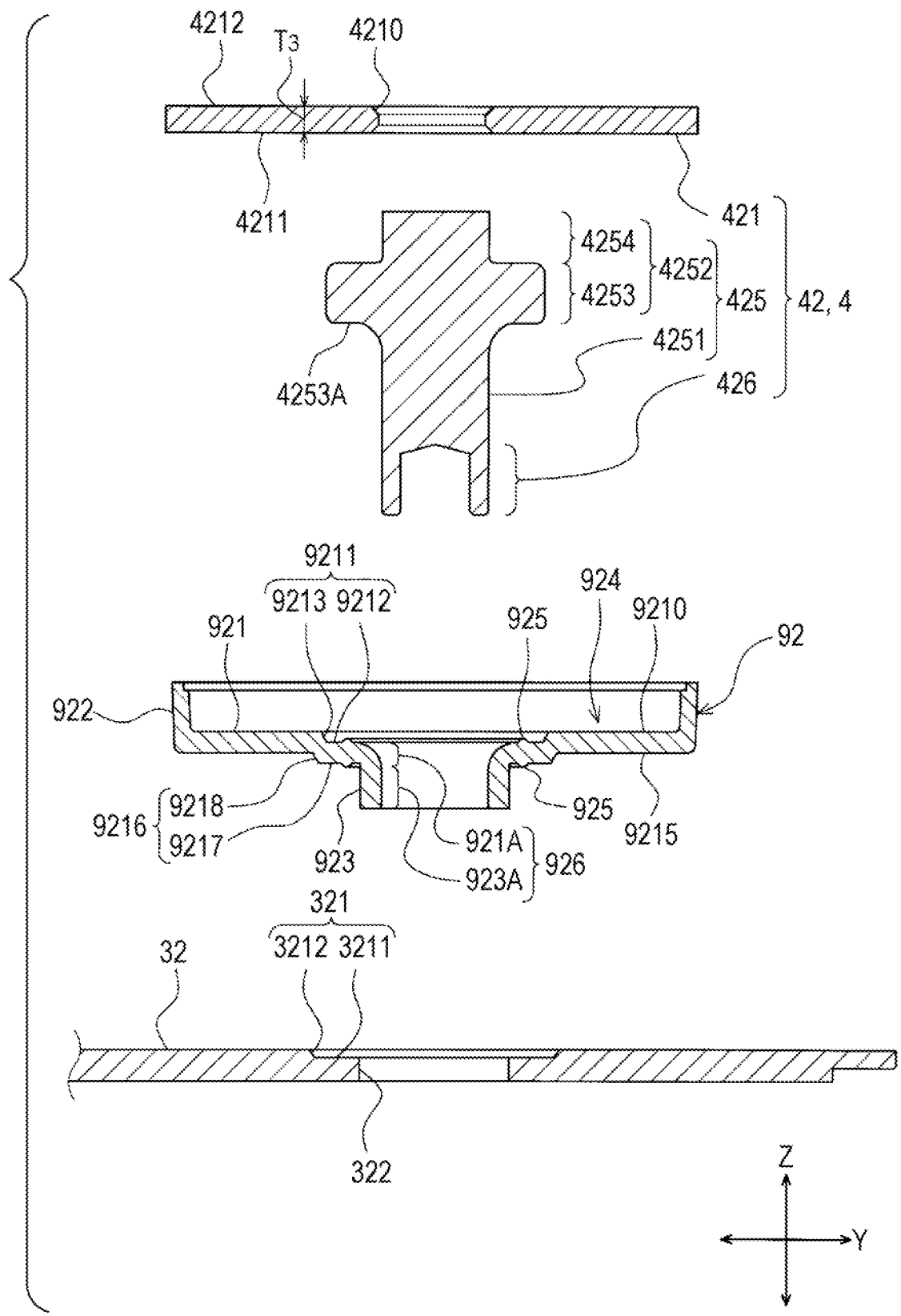
FIG. 8 is a view for describing the negative electrode external terminal, an outer gasket, a through hole formed in a lid plate and an area around the through hole.

The negative electrode external terminal 42 has: a terminal head 421 disposed outside the case 3; and a shaft portion 425 which extends from the terminal head 421 and penetrates the case 3 (the lid plate 32 in the example of this embodiment). The negative electrode external terminal 42 also has a large diameter portion 426 which expands from the shaft portion 425 along the inner surface of the case 3. In the negative electrode external terminal 42 in this embodiment, the terminal head 421 is made of an aluminum-based metal material, and the shaft portion 425 and the large diameter portion 426 are made of a copper-based metal material. That is, the terminal head 421, the shaft portion 425 and the large diameter portion 426 are members separate from each other. FIG. 3 and FIG. 8 show the large diameter portion 426 before the large diameter portion 426 is caulked.

The terminal head 421 is a plate-like member expanding along the lid plate 32. In this embodiment, the terminal head 421 is a plate-like member having a rectangular shape as viewed in the Z axis direction, and has a through hole 4210 at a center portion thereof. The terminal head 421 has a first oppositely-facing surface 4211 which expands along the outer surface of the lid plate 32 and oppositely faces the outer gasket 92. The terminal head 421 also has a connection surface 4212 to which a bus bar or the like is connected by welding or the like on a side opposite to the first oppositely-facing surface 4211. In this embodiment, the connection surface 4212 has a flat shape. A size (thickness) $T_3$ in the Z axis direction of the terminal head 421 is smaller than the thickness $T_2$ of the head body 412 of the positive electrode external terminal 41 (see FIG. 6 and FIG. 8). Further, a size in the X axis direction and a size in the Y axis direction of the terminal head 421 are larger than the size in the X axis direction and the size in the Y axis direction of the terminal head 411 of the positive electrode external terminal 41 (to be more specific, larger by an amount corresponding to a thickness of a peripheral wall portion 922 of the outer gasket 92).

The shaft portion 425 makes the current collector 5 disposed in the case 3 and the terminal head 421 disposed outside the case 3 electrically conductive with each other. The shaft portion 425 has: a shaft portion body 4251 which passes through the through hole 322 formed in the lid plate 32 in an extending manner; and a head fixing portion 4252 to which the terminal head 421 is fixed.

The shaft portion body 4251 is a columnar portion extending in the Z axis direction. In this embodiment, the shaft portion body 4251 is a circular columnar portion extending in the Z axis direction. The diameter of the shaft portion body 4251 is set equal to the diameter of the shaft portion 415 of the positive electrode external terminal 41.

The head fixing portion 4252 has: a first portion 4253 which has a larger diameter than the shaft portion body 4251; and a second portion 4254 which sandwiches the terminal head 421 (to be more specific, a peripheral edge portion around the through hole 4210 formed in the terminal head 421) in cooperation with the first portion 4253. In this embodiment, the first portion 4253 is a circular columnar portion having a larger diameter than other portions of the shaft portion body 4251. In this embodiment, the second portion 4254 is a portion formed in the following manner. A circular columnar portion extending in the Z axis direction from the first portion 4253 and having a size corresponding to a diameter of the through hole 4210 (see FIG. 8) is made to pass through the through hole 4210 and, in such a state, the second portion 4254 is caulked so that the second portion 4254 expands in the X-Y plane direction (see FIG. 7). The first portion 4253 has an outer diameter equal to the outer diameter of the first projecting portion 413 of the positive electrode external terminal 41. Further, the first portion 4253 has a pressing surface 4253A substantially equal to the pressing surface 4131 of the positive electrode external terminal 41 on an end portion thereof on an outer gasket 92 (lid plate 32) side. FIG. 8 shows the second portion 4254 of the head fixing portion 4252 before the second portion 4254 is caulked.

The large diameter portion 426 sandwiches the outer gasket 92 and the lid plate 32 in cooperation with the head fixing portion 4252 (to be more specific, the first portion 4253). To be more specific, the large diameter portion 426 expands in the X-Y plane direction from the shaft portion body 4251, and sandwiches the outer gasket 92, the lid plate 32, the inner gasket 91 and the current collector 5 in the Z axis direction in cooperation with the head fixing portion 4252 (to be more specific, the first portion 4253). With such a configuration, on a negative electrode external terminal 42 side, the negative electrode external terminal 42, the outer gasket 92, the inner gasket 91 and the current collector 5 are fixed to the lid plate 32. The large diameter portion 426 in this embodiment is formed in the following manner. In the same manner as the large diameter portion 416 of the positive electrode external terminal 41, in a state shown in FIG. 8, the shaft portion body 4251 is made to pass through the through hole 926 formed in the outer gasket 92 (the through hole 322 formed in the lid plate 32), the through hole 912 formed in the inner gasket 91 and the through hole 54 formed in the current collector 5. In such a state, a circular cylindrical portion (a portion indicated by symbol 426 in FIG. 8) extending to a distal end side of the shaft portion body 4251 and being exposed to the inside of the case is caulked. Due to such caulking, the negative electrode external terminal 42 and the current collector 5 can be brought into sufficient contact with each other so that the negative electrode external terminal 42 and the current collector 5 are made electrically conductive with each other.

The inner gasket 91 has insulating property, and provides insulation between the lid plate 32 and the current collector 5. The inner gasket 91 is disposed between the lid plate 32 and the current collector 5 in the inside of the case 3. In this embodiment, the inner gasket 91 is made of a resin having insulating property.

The inner gasket 91 is made of a thermoplastic resin. In this embodiment, the inner gasket 91 is made of a thermoplastic resin formed by uniformly mixing a polyolefin elastomer made of at least either one of polyethylene (PE) or polypropylene (PP) into a polyphenylene sulfide (PPS) resin, for example.

A material for forming the inner gasket 91 is not limited to the above-mentioned thermoplastic resin. A material for forming the inner gasket 91 may be a tetrafluoroethylene-perfluoroalkyl vinyl ether copolymer resin (PFA), for example.

To be more specific, the inner gasket 91 is a plate-like member. In this embodiment, the inner gasket 91 is a rectangular plate-like member extending in the Y axis direction. The inner gasket 91 has a recessed portion 911 in which a portion of the current collector 5 is fitted at a portion thereof which opposedly faces the current collector 5 (a portion on a side opposite to the lid plate 32). The inner gasket 91 has the through hole 912 through which the shaft portion 415, 425 is made to pass through at a position which is made to overlap with the through hole 322 formed in the lid plate 32 in the Z axis direction. In this embodiment, the inner gasket 91 is disposed on a positive electrode external terminal 41 side and a negative electrode external terminal 42 side of the lid plate 32 respectively. That is, the energy storage device 1 includes the pair of inner gaskets 91.

The outer gasket 92 has insulating property, and provides insulation between the lid plate 32 and the external terminal 4. The outer gasket 92 is disposed for providing sealing between the lid plate 32 and the external terminal 4. That is, the outer gasket 92 has insulating property and sealability. The outer gasket 92 is disposed between the lid plate 32 and the external terminal 4 outside the case 3. In this embodiment, the outer gasket 92 is made of a resin.

To be more specific, the outer gasket 92 is made of a thermoplastic resin material. In this embodiment, the outer gasket 92 is made of a thermoplastic resin material formed by uniformly mixing a polyolefin elastomer made of at least one of PE and PP into a PPS resin, for example.

A material for forming the outer gasket 92 is not limited to the above-mentioned thermoplastic resin. A material for forming the outer gasket 92 may be PFA, for example.

In this embodiment, in the same manner as the inner gasket 91, the outer gasket 92 is disposed on the positive electrode external terminal 41 side and the negative electrode external terminal 42 side respectively. That is, the energy storage device 1 includes the pair of outer gaskets 92. In the energy storage device 1 of this embodiment, the outer gasket 92 disposed on the positive electrode external terminal 41 side and the outer gasket 92 disposed on the negative electrode external terminal 42 side have the same configuration. Accordingly, the outer gasket 92 disposed on the positive electrode external terminal 41 side is described hereinafter.

The outer gasket 92 has a second projecting portion 925 on at least one of a second opposedly-facing surface 9210 which opposedly faces the head body 412 and a third opposedly-facing surface 9215 which opposedly faces the lid plate 32 (case 3) in a region which corresponds to the first projecting portion 413. The second projecting portion 925 surrounds the shaft portion 415, and is collapsed (compressed) due to pressing of the pressing surface 4131 toward the outer gasket 92.

To be more specific, the outer gasket 92 has: a base portion (gasket body) 921 expanding along the lid plate 32; the peripheral wall portion 922 connected to a peripheral edge of the base portion 921; and a sleeve portion 923 connected to the base portion 921 on a side opposite to the peripheral wall portion 922.

The base portion 921 is a plate-like portion. The base portion 921 is larger than the terminal head 411 of the positive electrode external terminal 41 in size as viewed in the Z axis direction. In this embodiment, the base portion 921 is slightly larger than the terminal head 411 in size, and has a rectangular shape which conforms to a profile of the terminal head 411. The base portion 921 has the second opposedly-facing surface 9210 which opposedly faces the head body 412 and the third opposedly-facing surface 9215 which is directed to a side opposite to the second opposedly-facing surface 9210 (that is, opposedly facing the lid plate 32). The base portion 921 has the second projecting portion 925 on at least one of the second opposedly-facing surface 9210 and the third opposedly-facing surface 9215 in a region which corresponds to the first projecting portion 413 (in the example of this embodiment, a position which is made to overlap with the first projecting portion 413 in the Z axis direction). The second projecting portion 925 surrounds the shaft portion 415, and is collapsed due to pressing of the pressing surface 4131 toward the outer gasket 92. In this embodiment, the second projecting portion 925 is disposed on the second opposedly-facing surface 9210 and the third opposedly-facing surface 9215 respectively. These two second projecting portions 925 are disposed on the second opposedly-facing surface 9210 and the third opposedly-facing surface 9215 at a position (region) where the second opposedly-facing surface 9210 and the third opposedly-facing surface 9215 overlap with each other in the Z axis direction.

The base portion 921 has a recessed portion 9211 at a center portion of the second opposedly-facing surface 9210. To be more specific, the recessed portion 9211 has: a planar portion 9212 expanding in the X-Y plane direction; and an inner peripheral surface portion 9213 extending from a peripheral edge of the planar portion 9212. In this embodiment, the recessed portion 9211 has a circular profile as viewed in the Z axis direction, and a diameter (inner diameter) of the profile corresponds to a diameter of the first projecting portion 413 of the positive electrode external terminal 41. These planar portion 9212 and inner peripheral surface portion 9213 form portions of the second opposedly-facing surface 9210.

The base portion 921 also has a projecting portion 9216 at a center portion of the third opposedly-facing surface 9215. To be more specific, the projecting portion 9216 has: a planar portion 9217 expanding in the X-Y plane direction; and an outer peripheral surface portion 9218 extending from a peripheral edge of the planar portion 9217. These planar portion 9217 and outer peripheral surface portion 9218 form the third opposedly-facing surface 9215. In this embodiment, the projecting portion 9216 has a circular profile which is coaxial with the recessed portion 9211 as viewed in the Z axis direction, and the diameter (outer diameter) of the profile is larger than the diameter (inner diameter) of the recessed portion 9211.

The base portion 921 also has, at a center portion thereof, a through hole 921A through which the shaft portion 415 of the positive electrode external terminal 41 can be made to pass. In this embodiment, the through hole 921A is a circular through hole which is coaxial with the recessed portion 9211 and the projecting portion 9216, and penetrates the base portion 921 in the Z axis direction. A diameter (inner diameter) of the through hole 921A corresponds to a diameter (outer diameter) of the shaft portion 415 of the positive electrode external terminal 41.

Figure 5:
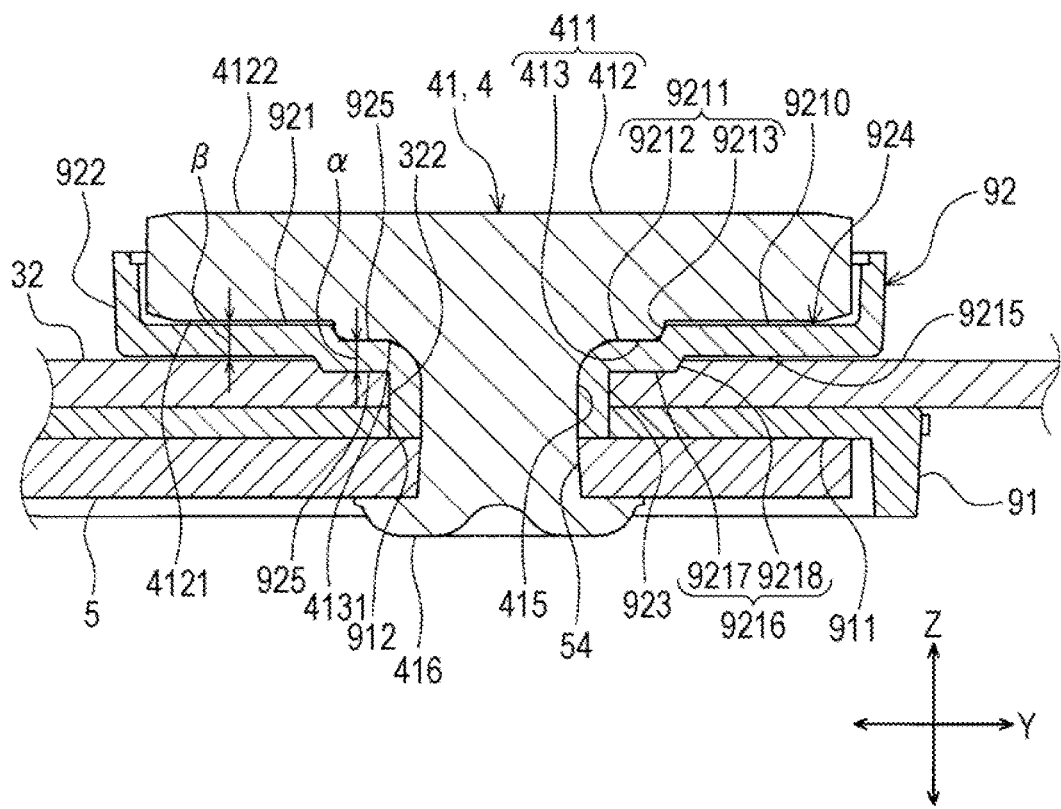
FIG. 5 is an enlarged cross-sectional view of a positive electrode external terminal and an area around the positive electrode external terminal.

As viewed in the Z axis direction, the second projecting portions 925 extend on the planar portion 9212 of the recessed portion 9211 and the planar portion 9217 of the projecting portion 9216 respectively in the circumferential direction and concentrically with the recessed portion 9211 and the projecting portion 9216. In a state where the outer gasket 92 is assembled in the energy storage device 1 (that is, in the energy storage device 1), as shown in FIG. 5, the two respective second projecting portions 925 are collapsed (compressed). In this state, a projection area of the second projecting portion 925 in the Z axis direction is smaller than a projection area of the pressing surface 4131 of the first projecting portion 413 in the Z axis direction (see FIG. 9). On the other hand, in a state before the outer gasket 92 is assembled to the energy storage device 1, as shown in FIG. 6, two respective second projecting portions 925 project from the planar portions 9212, 9217 respectively in the Z axis direction. That is, in a state before the second projecting portions 925 are collapsed by the pressing surface 4131, the second projecting portions 925 project from the second opposedly-facing surface 9210 and the third opposedly-facing surface 9215 respectively in the Z axis direction, and extend so as to surround the shaft portion 415. The second projecting portion 925 has a circular shape coaxial with a center axis of the shaft portion 415 (the recessed portion 9211 and the projecting portion 9216) as viewed in the Z axis direction. A width of the second projecting portion 925 (a size of the shaft portion 415 in the radial direction) in a projecting state is smaller than a width of the pressing surface 4131 in the same direction.

The peripheral wall portion 922 is raised (erected) from the base portion 921 on a side opposite to the lid plate 32. To be more specific, in this embodiment, the peripheral wall portion 922 extends along a peripheral edge of the base portion 921, and extends from the peripheral edge of the base portion 921 on a side opposite to the lid plate 32. The recessed portion 924 into which the terminal head 411 of the positive electrode external terminal 41 is fitted is formed in this manner.

The sleeve portion 923 is a cylindrical portion extending from the base portion 921. In this embodiment, the sleeve portion 923 has a circular cylindrical shape. The sleeve portion 923 extends from the base portion 921 and passes through the inside of the through hole 322 formed in the lid plate 32. An inner peripheral surface of the sleeve portion 923 which defines a through hole 923A and an inner peripheral surface of the base portion 921 which defines the through hole 921A are formed continuously with each other. The through hole 926 formed in the outer gasket 92 through which the shaft portion 415 of the positive electrode external terminal 41 is made to pass through is defined by the inner peripheral surface of the base portion 921 which defines the through hole 921A and the inner peripheral surface of the sleeve portion 923 which defines the through hole 923A. That is, the through hole 921A formed in the base portion 921 and the through hole 923A formed in the sleeve portion 923 are formed continuously with each other thus forming the through hole 926 formed in the outer gasket 92. The sleeve portion 923 is fitted between the shaft portion 415 which is made to pass through the through hole 322 formed in the lid plate 32 and an inner peripheral surface of the lid plate 32 which defines the through hole 322 without forming a gap therebetween. With such a configuration, the sleeve portion 923 provides insulation between the shaft portion 415 and the lid plate 32 (to be more specific, the inner peripheral surface of the lid plate 32 which defines the through hole 322). The sleeve portion 923 is disposed for providing sealing between the shaft portion 415 and the inner peripheral surface of the lid plate 32 which defines the through hole 322.

As viewed in the Z axis direction, the terminal head 421 of the negative electrode external terminal 42 is larger than the terminal head 411 of the positive electrode external terminal 41 in size. Accordingly, although the terminal head 411 is fitted in the recessed portion 924 formed by the base portion 921 and the peripheral wall portion 922 in the outer gasket 92 disposed on the positive electrode external terminal 41 side (see FIG. 5), in the outer gasket 92 disposed on the negative electrode external terminal 42 side, an end portion of the peripheral wall portion 922 (an open peripheral edge portion of the recessed portion 924) is brought into contact with the terminal head 421 (a peripheral edge portion of the terminal head 421 in the example of this embodiment) from a first opposedly-facing surface 4211 side. That is, the peripheral edge portion of the terminal head 421 of the negative electrode external terminal 42 is supported by the peripheral wall portion 922 of the outer gasket 92 from the first opposedly-facing surface 4211 side. Accordingly, a space is formed between the terminal head 421 of the negative electrode external terminal 42 and the base portion 921 of the outer gasket 92 (see FIG. 7).

Returning to FIG. 2 and FIG. 3, the current collectors 5 are disposed in the case 3, and are directly or indirectly connected to the electrode assembly 2 in an electrically conductive manner. In this embodiment, each current collector 5 is made conductive with the electrode assembly 2 by way of clip members 50. That is, the energy storage device 1 includes the clip members 50 which make the electrode assembly 2 and the current collectors 5 conductive with each other.

The current collector 5 is made of a material having conductivity. The current collector 5 is disposed on the positive electrode and the negative electrode of the energy storage device 1 respectively. To be more specific, each current collector 5 is disposed along an inner surface of the case 3. In this embodiment, the current collector 5 makes the external terminal 4 and the clip member 50 conductive with each other. The current collector 5 has an L shape as viewed in the X axis direction. In this embodiment, the current collector 5 is formed by bending a metal material having a plate shape and being cut into a predetermined shape. The current collector 5 has the through hole 54 at a position where the current collector 5 is connected with the external terminal 4.

The insulating member 7 has a bag shape, for example. The insulating member 7 is disposed between the case 3 (to be more specific, the case body 31) and the electrode assembly 2. The insulating member 7 is made of a material having insulating property. In this embodiment, the insulating member 7 having a bag shape is formed by folding a sheet-like member having insulating property and being cut into a predetermined shape. In this embodiment, the insulating member 7 is made of a resin such as polypropylene or polyphenylene sulfide, for example. In the energy storage device 1 of this embodiment, the electrode assembly 2 (to be more specific, the electrode assembly 2 and the current collectors 5) which is in a state of being stored in the insulating member 7 having a bag shape is stored in the case 3.

Figure 10:
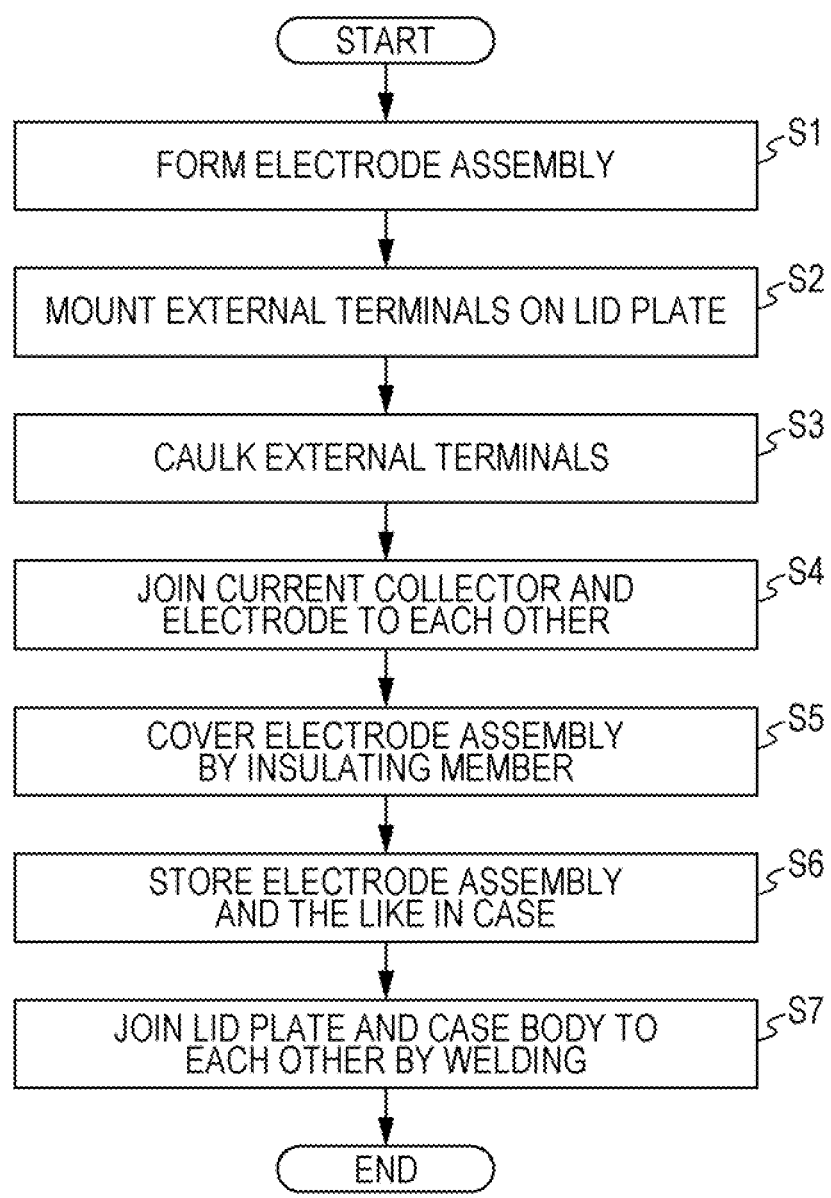
FIG. 10 is a flowchart showing a method of manufacturing an energy storage device.

The energy storage device 1 having the above-mentioned configuration is manufactured as shown in FIG. 10 and below.

The positive electrode 23 and the negative electrode 24 are wound around the winding core 21 in a state where the positive electrode 23 and the negative electrode 24 are laminated with each other with the separator 25 interposed therebetween. The electrode assembly 2 is formed in this manner (step S1).

Next, to assemble the external terminals 4 (the positive electrode external terminal 41, the negative electrode external terminal 42), the current collectors 5 and the like to the lid plate 32, the shaft portions 415, 425 of the external terminals 4 are made to penetrate the case 3 such that each outer gasket 92 is disposed between the terminal head 411 and the lid plate 32 and between the terminal head 421 and the lid plate 32 (step S2). To be more specific, as shown in FIG. 3, FIG. 5 to FIG. 8, the outer gaskets 92 are disposed outside the lid plate 32 (on a side of a surface of the case 3 which forms an outer surface) and the inner gaskets 91 are disposed inside the lid plate 32 (on a side of a surface of the case 3 which forms an inner surface) such that the sleeve portion 923 of each outer gasket 92 is inserted into each through hole 322 formed in the lid plate 32, and the through hole 926 formed in each outer gasket 92 and the through hole 912 formed in each inner gasket 91 are made to overlap with each other. At this stage of the operation, the end portion of each current collector 5 is fitted in the recessed portion 911 of each inner gasket 91 such that the through hole 54 formed in the end portion of each current collector 5 and the through hole 912 formed in the inner gasket 91 are made to overlap with each other. In such a state, the shaft portion 415, 425 of the external terminal 4 is made to pass through the through hole 926 formed in the outer gasket 92, the through hole 912 formed in the inner gasket 91 and the through hole 54 formed in the current collector 5.

Subsequently, to fix the external terminals 4, the outer gaskets 92, the inner gaskets 91 and the current collectors 5 which are disposed above to the lid plate 32, portions (a portion indicated by symbol 416 in FIG. 6 and a portion indicated by symbol 426 in FIG. 8) each of which is continuously formed with the distal end of the shaft portion 415, 425 and is made to penetrate the case 3 are caulked. With such caulking, large diameter portions 416, 426 which expand from the shaft portions 415, 425 respectively along the case 3 in the radial direction of the shaft portions 415, 425 are formed in the inside of the case 3 (step S3). At this stage of the operation, the portions each of which is continuously formed with the distal end of the shaft portion 415, 425 are caulked in a state where the terminal heads 411, 421 are pressed to the case 3 (to be more specific, a peripheral edge portion around each through hole 322 formed in the lid plate 32) and hence, both two second projecting portions 925 formed on each outer gasket 92 are collapsed by a pressing force toward the case 3 from pressing surfaces 4131, 4253A. In this manner, the outer gasket 92, the case 3, the inner gasket 91 and the current collector 5 are sandwiched between the pressing surface 4131, 4253A (the first projecting portion 413, the head fixing portion 4252) and the large diameter portion 416, 426. Accordingly, a gap formed between the external terminal 4 and the case 3 (the peripheral edge portion around each through hole 322 formed in the lid plate 32 in an example of this embodiment) is hermetically sealed, and insulation is provided between the external terminal 4 and the case 3. Further, it is possible to make the external terminals 4 and the current collectors 5 electrically conductive with each other with certainty.

After the current collectors 5 are fixed to the lid plate 32, the electrode assembly 2 is connected to the current collectors 5 (step S4). To be more specific, each of end portions of the electrode assembly 2 (end portions of the layered product 22 in the winding axis direction, to be more specific, a portion of the positive electrode 23 where only the metal foil 231 is laminated or a portion of the negative electrode 24 where only the metal foil 241 is laminated) is sandwiched by the clip members 50. The clip members 50 which sandwich each end portion of the electrode assembly 2 and the current collector 5 are connected to each other by ultrasonic bonding, resistance welding or the like.

After the electrode assembly 2, the external terminals 4, the current collectors 5, the outer gaskets 92, the inner gaskets 91 and the like are assembled to the lid plate 32 as described above, the electrode assembly 2, the current collectors 5 and the like are covered by the insulating member 7 (step S5). The electrode assembly 2, the current collector 5 and the like which are covered by the insulating member 7 are inserted into the case body 31 (step S6). With such steps, the opening of the case body 31 is closed by the lid plate 32 to which the electrode assembly 2, the current collectors 5 and the like are assembled. In a state where the peripheral edge portion of the lid plate 32 is made to overlap with the open peripheral edge portion 34 of the case body 31, the peripheral edge portion and the open peripheral edge portion 34 are joined to each other by welding (by laser welding in the example of this embodiment) (step S7) so that the energy storage device 1 is completed.

According to the above-mentioned energy storage device 1, a force which presses the outer gasket 92 toward the case 3 (to be more specific, the lid plate 32) by the terminal head 411 is concentrated on the pressing surface 4131 which projects from the first oppositely-facing surface 4121 and, at the same time, a force from the pressing surface 4131 is effectively applied to the second projecting portion 925 in a collapsed state brought about by the pressing surface 4131. Accordingly, in the energy storage device 1, sufficient sealability can be ensured between the positive electrode external terminal 41 and the case 3 (to be more specific, at least one (a side on which the second projecting portion 925 is disposed) of between the first projecting portion 413 and the outer gasket 92 and between the outer gasket 92 and the case 3).

Figure 9:
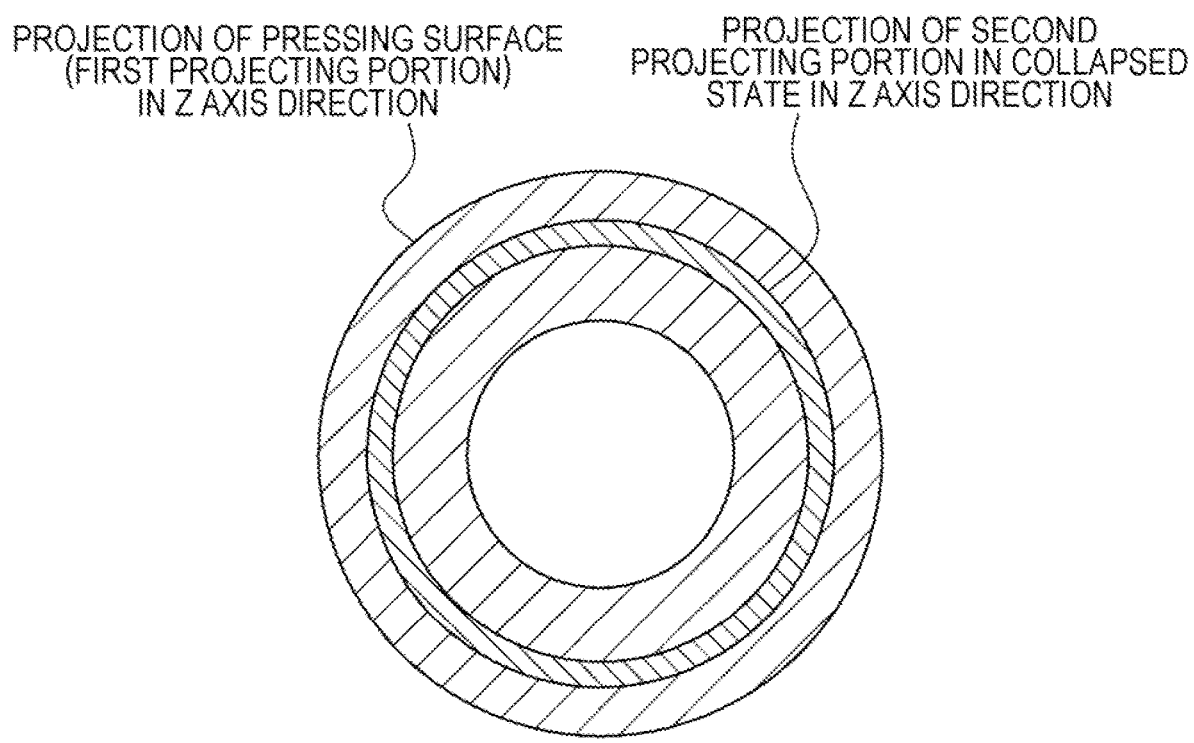
FIG. 9 is a projection view of a first projecting portion and a second projecting portion in a Z axis direction.

In the energy storage device 1 of this embodiment, a projection area of the second projecting portion 925 in the direction that the shaft portion 415 extends (Z axis direction) is smaller than a projection area of the pressing surface 4131 in the Z axis direction (the direction that the shaft portion 415 extends) (see FIG. 9). Accordingly, in a state where a face pressure applied to the outer gasket 92 by the first projecting portion 413 from the pressing surface 4131 is enhanced in a region which surrounds the shaft portion 415, a region which surrounds the shaft portion 415 and has a higher face pressure generated by the second projecting portion 925 (the second projecting portion 925 collapsed by the pressing surface 4131) is partially formed in the region where the face pressure is increased. Accordingly, in the energy storage device 1, sealability between the positive electrode external terminal 41 and the case 3 is further enhanced.

In the energy storage device 1 of this embodiment, the second projecting portion 925 is disposed on the second oppositely-facing surface 9210 and the third oppositely-facing surface 9215 respectively. With such a configuration, in the energy storage device 1, sufficient sealability can be ensured both of between the first projecting portion 413 and the outer gasket 92 and between the outer gasket 92 and the case 3.

In the energy storage device 1 of this embodiment, the first projecting portion 413 is disposed adjacently to the shaft portion 415. With such a configuration, a force pulled toward a case 3 (outer gasket 92) side by the shaft portion 415 is effectively transmitted to the first projecting portion 413. Accordingly, the sealability between the positive electrode external terminal 41 and the case 3 can be further enhanced compared to a case where the first projecting portion 413 is disposed at a position away from the shaft portion 415 such as a position on an outer side (close to a peripheral edge) of the first opposedly-facing surface 4121.

In the energy storage device 1 of this embodiment, the head body 412 and the first projecting portion 413 are integrally formed with each other, and in the terminal head 411 which includes the head body 412 and the first projecting portion 413, the thickness $T_1$ which is a size in the Z axis direction of a portion of the terminal head 411 where the first projecting portion 413 is formed is set larger than a thicknesses $T_2$ of other portions of the terminal head 411 (see FIG. 6). With such a configuration, while ensuring a strength of the portion of the terminal head 411 where the first projecting portion 413 is disposed (that is, a strength for pressing the outer gasket 92 by the pressing surface 4131), a size of the energy storage device 1 (the size of the energy storage device 1 in the direction that the shaft portion 415 extends) can be suppressed. That is, in the energy storage device 1 of this embodiment, by reducing thicknesses of other portions of the terminal head 411 while ensuring a thickness (strength) of a portion of the terminal head 411 which requires a strength at the time of pressing outer gasket 92, a size in the thickness direction (Z axis direction) of the terminal head 411 can be suppressed.

In the energy storage device 1 of this embodiment, a diameter (at the outer edge) of the recessed portion 321 of the lid plate 32 corresponds to a diameter (at the outer edge) of the first projecting portion 413 as viewed in the Z axis direction, and a distance between the pressing surface 4131 and the bottom portion 3211 of the recessed portion 321 is set smaller than a distance between the first opposedly-facing surface 4121 and the opposedly-facing surface (region) of the case 3 which opposedly faces the first opposedly-facing surface 4121.

With such a configuration, while ensuring sealability between the positive electrode external terminal 41 and the case 3 by sandwiching the outer gasket 92 between the pressing surface 4131 of the first projecting portion 413 and the bottom portion 3211 of the recessed portion 321, it is also possible to ensure sealability between the positive electrode external terminal 41 and the case 3 at the position by sandwiching the outer gasket 92 between the outer edge portion of the recessed portion 321 and the outer edge portion of the first projecting portion 413. As a result, in the energy storage device 1, sufficient sealability can be ensured with certainty between the positive electrode external terminal 41 and the case 3.

In the energy storage device 1 of this embodiment, the large diameter portion 416 of the positive electrode external terminal 41 expands to the position of the second projecting portion 925 or to the outside of the position as viewed in the Z axis direction. Accordingly, the outer gasket 92 and the case 3 are sandwiched between the first projecting portion 413 and the large diameter portion 416 and hence, a pressing force by the first projecting portion 413 (pressing surface 4131) is effectively (efficiently) applied to the outer gasket 92.

In the energy storage device 1 manufactured by the method of manufacturing the energy storage device 1 according to the embodiment, a force which presses the outer gasket 92 toward the case 3 by the terminal head 411 is concentrated on the pressing surface 4131 which projects from the first opposedly-facing surface 4121 and, at the same time, a force from the pressing surface 4131 is effectively applied to the second projecting portion 925 in a collapsed state brought about by the pressing surface 4131. Accordingly, in the manufactured energy storage device 1, sufficient sealability can be ensured between the positive electrode external terminal 41 and the case 3 (to be more specific, at least one (a side on which the second projecting portion 925 is disposed) of between the first projecting portion 413 and the outer gasket 92 and between the outer gasket 92 and the case 3).

It is needless to say that the energy storage device of the present invention is not limited to the above-mentioned embodiment, and various modifications are conceivable in the range without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

In the energy storage device 1 of the above-mentioned embodiment, the first projecting portion 413 (pressing surface 4131) surrounds the shaft portion 415 over the whole circumference (that is, the first projecting portion 413 is continuously formed in the circumferential direction of the shaft portion 415). However, the present invention is not limited to the above-mentioned configuration. For example, the first projecting portion 413 (pressing surface 4131) may be intermittently formed in the circumferential direction.

Figure 11:
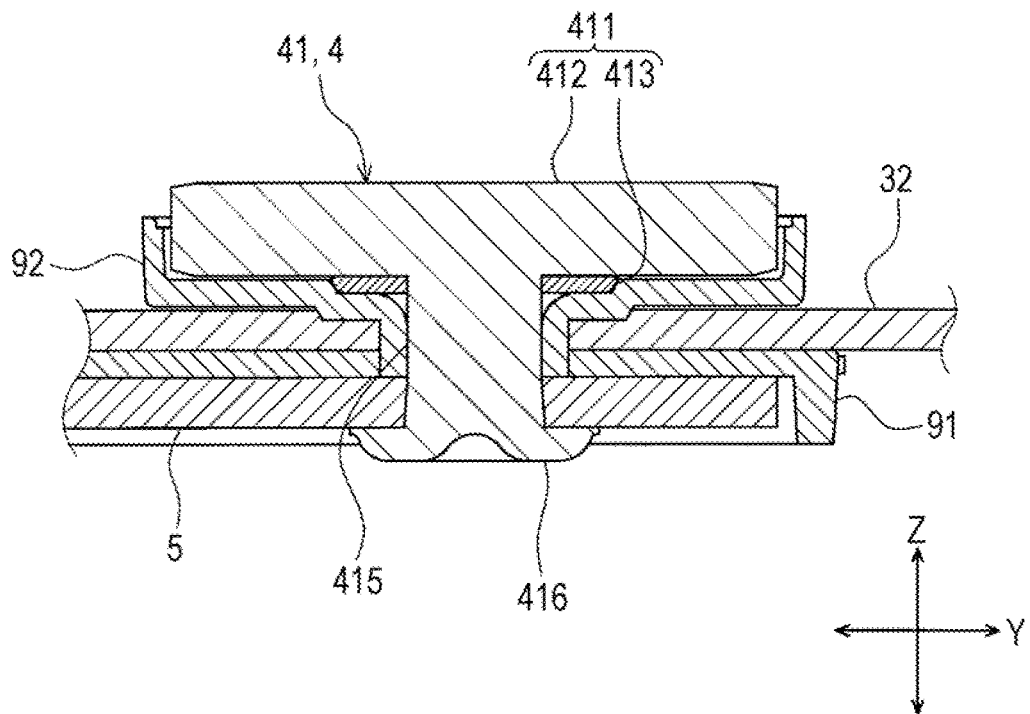
FIG. 11 is an enlarged cross-sectional view of an external terminal and an area around the external terminal according to another embodiment.

In the energy storage device 1 of the above-mentioned embodiment, the head body 412 and the first projecting portion 413 are formed as an integral body. However, the present invention is not limited to the above-mentioned configuration. The head body 412 and the first projecting portion 413 may be formed as separate members as shown in FIG. 11.

Figure 12:
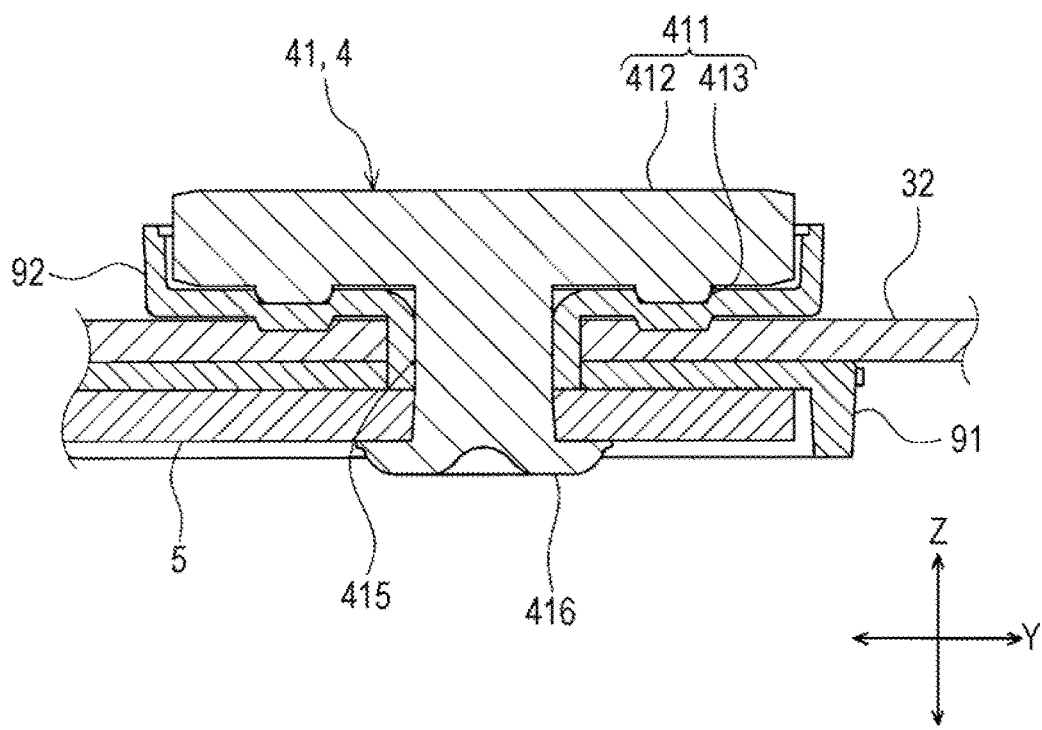
FIG. 12 is an enlarged cross-sectional view of an external terminal and an area around the external terminal according to another embodiment.

In the energy storage device 1 of the above-mentioned embodiment, the first projecting portion 413 is disposed adjacently to the shaft portion 415. However, the present invention is not limited to the above-mentioned configuration. The first projecting portion 413 may be disposed at a position away from the shaft portion 415 as shown in FIG. 12.

Figure 13:
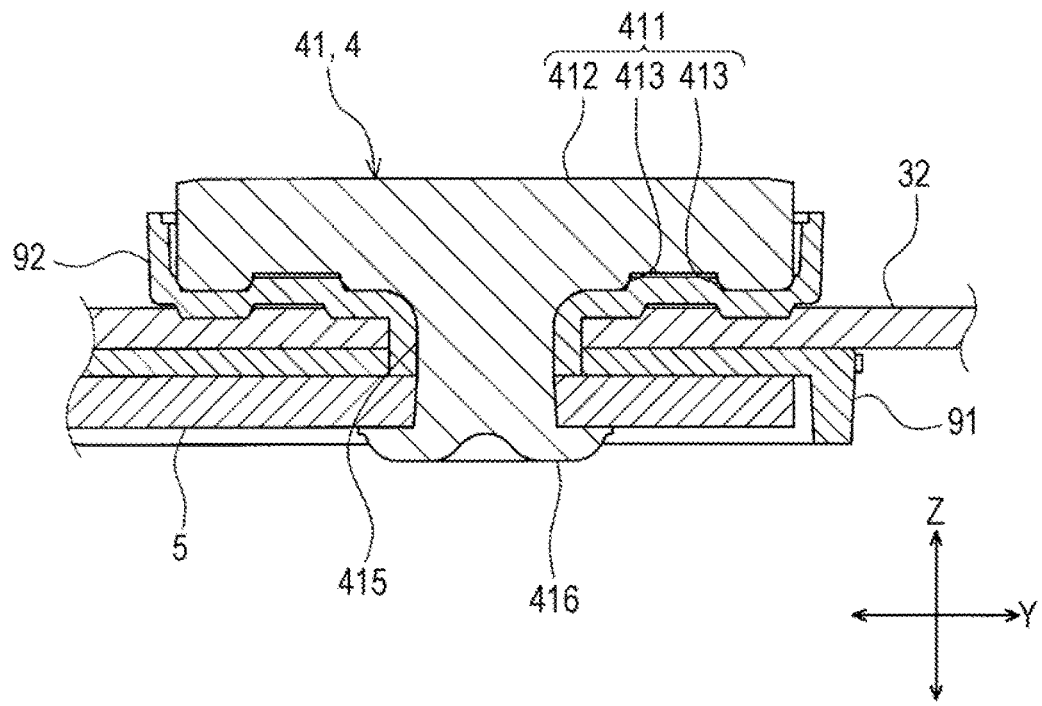
FIG. 13 is an enlarged cross-sectional view of an external terminal and an area around the external terminal according to another embodiment.

As shown in FIG. 13, a plurality of (two in an example shown in FIG. 13) first projecting portions 413 may be formed on the terminal head 411. In this case, the second projecting portions 925 may be formed at positions which correspond to the plurality of respective first projecting portions 413. Alternatively, the second projecting portions 925 may be formed only at positions which correspond to some first projecting portions 413 of the plurality of first projecting portions 413.

In the energy storage device 1 of the above-mentioned embodiment, the second projecting portion 925 is formed on both surfaces of the base portion 921 of the outer gasket respectively, that is, on the second opposedly-facing surface 9210 and the third opposedly-facing surface 9215 of the base portion 921 respectively. However, the present invention is not limited to the above-mentioned configuration. The second projecting portion 925 may be formed only on the second opposedly-facing surface 9210 of the base portion 921. Alternatively, the second projecting portion 925 may be formed only on the third opposedly-facing surface 9215 of the base portion 921.

Figure 14:
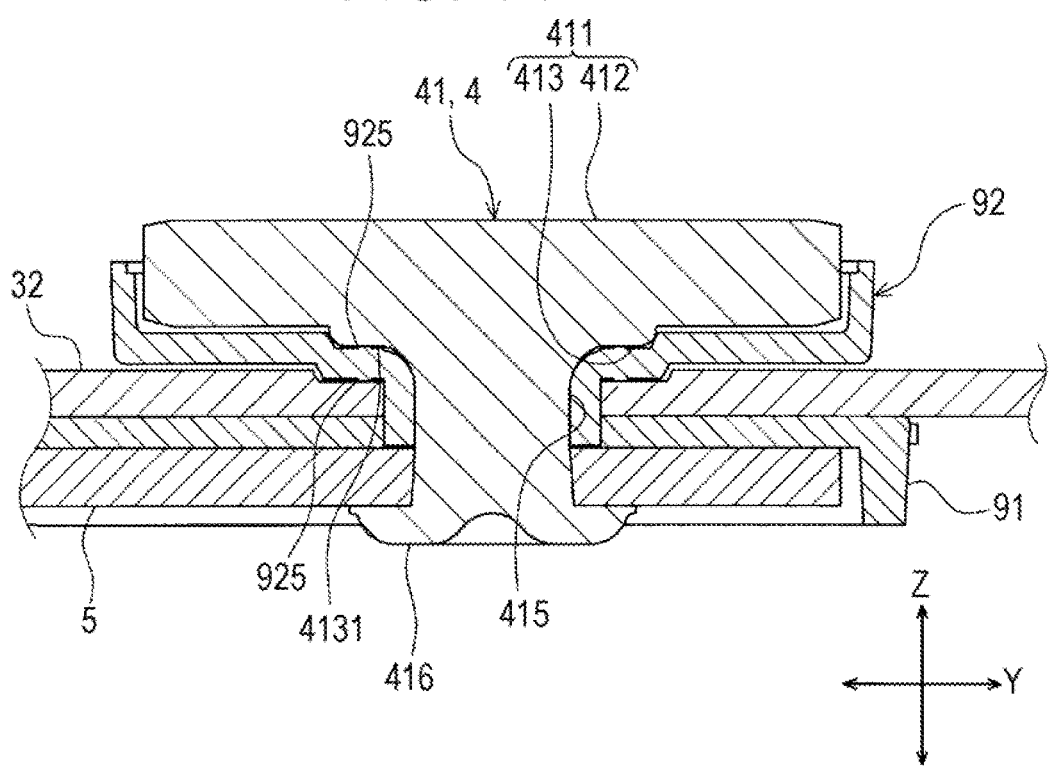
FIG. 14 is an enlarged cross-sectional view of an external terminal and an area around the external terminal according to another embodiment.

In the energy storage device 1 of the above-mentioned embodiment, the second projecting portion 925 is brought into a substantially completely collapsed state. However, the present invention is not limited to the above-mentioned configuration. As shown in FIG. 14, in the energy storage device 1, the second projecting portion 925 may be brought into a state where a portion of the second projecting portion 925 (a distal end portion in the projecting direction in the example shown in FIG. 14) is compressed (collapsed) by the first projecting portion 413.

In the energy storage device 1 of the above-mentioned embodiment, the second projecting portion 925 and the base portion (gasket body) 921 of the outer gasket 92 are formed as an integral body. However, the present invention is not limited to the above-mentioned configuration. The second projecting portion 925 and the base portion 921 of the outer gasket 92 may be formed as separate members. For example, the second projecting portion may be formed of a resin member having an O shape or the like which is disposed between the base portion 921 of the outer gasket 92 and the first projecting portion 413.

In the energy storage device 1 of the above-mentioned embodiment, the external terminal 4 having the first projecting portion 413 is disposed on a positive electrode side. However, the present invention is not limited to the above-mentioned configuration. The external terminal 41 having the first projecting portion 413 may be disposed on a negative electrode side. Alternatively, the external terminal 41 having the first projecting portion 413 may be disposed on both the positive electrode side and the negative electrode side respectively.

In the energy storage device 1 of the above-mentioned embodiment, the lid plate 32 has the recessed portion 321. However, the present invention is not limited to the above-mentioned configuration. The lid plate 32 may not have the recessed portion 321. That is, an area of the lid plate 32 around the through hole 322 may not be indented from other portions of the lid plate 32.

In the energy storage device 1 of the above-mentioned embodiment, the base portion 921 of the outer gasket 92 has, in a state where the base portion 921 is not sandwiched by the external terminal 4 and the lid plate 32, the recessed portion 9211 on a second opposedly-facing surface 9210 side, and has the projecting portion 9216 on the third opposedly-facing surface 9215 side at a position which corresponds to the recessed portion 9211 (a position which overlaps with the recessed portion 9211 in the Z axis direction). However, the present invention is not limited to the above-mentioned configuration. The base portion 921 may be formed into a flat plate shape. Further, the recessed portion 9211 and the projecting portion 9216 may be formed by sandwiching the base portion 921 between the external terminal 4 having the first projecting portion 413 and the lid plate 32 having the recessed portion 321.

The external terminals 4 in the above-mentioned embodiment are mounted on the lid plate 32. However, the present invention is not limited to the above-mentioned configuration. The external terminals 4 may be mounted on parts other than the lid plate 32 of the case 3 (the closed portion 311, the long wall portion 313, the short wall portion 314 or the like).

In the above-mentioned embodiment, the description has been made with respect to the case where the energy storage device is the chargeable/dischargeable nonaqueous electrolyte secondary battery (for example, lithium ion secondary battery). However, a type and a size (capacity) of an energy storage device can be desirably selected. In the above-mentioned embodiment, the description has been made with respect to the lithium ion secondary battery as one example of the energy storage device. However, the present invention is not limited to the lithium ion secondary battery. For example, the present invention is also applicable to various secondary batteries, primary batteries, and energy storage devices of capacitors such as electric double layer capacitors.

Figure 15:
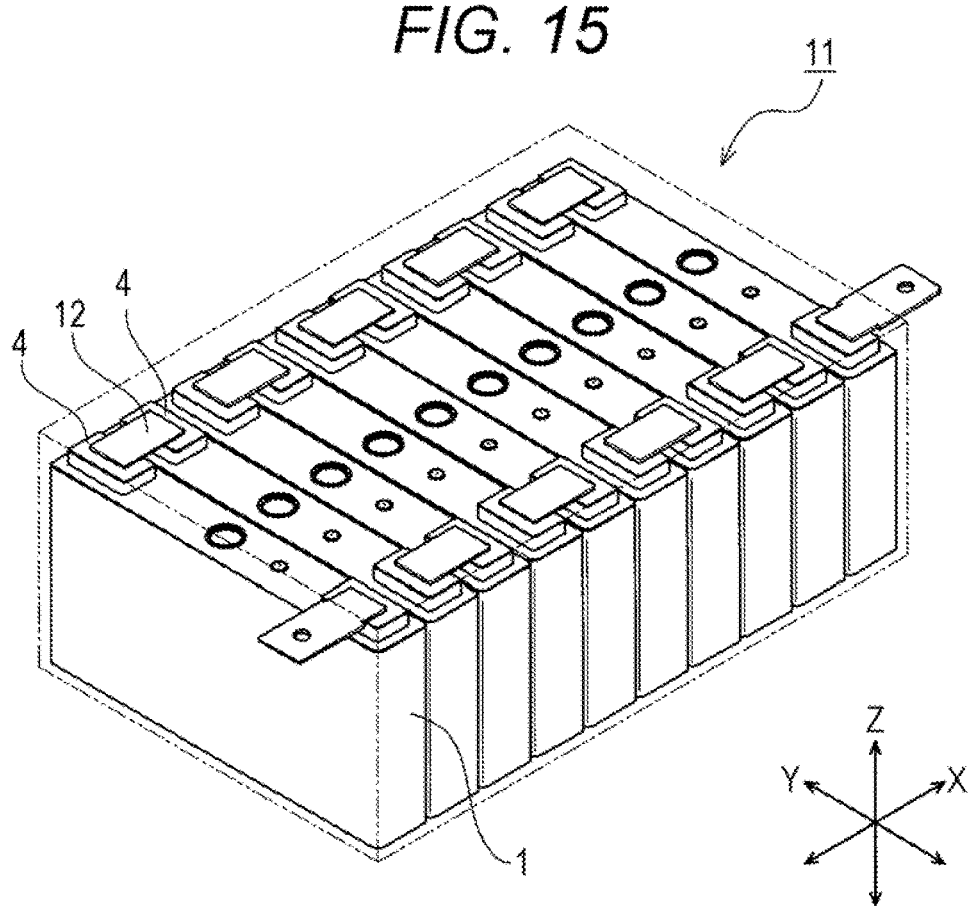
FIG. 15 is a schematic view of an energy storage apparatus which includes the energy storage device according to the embodiment.
Figure 16:
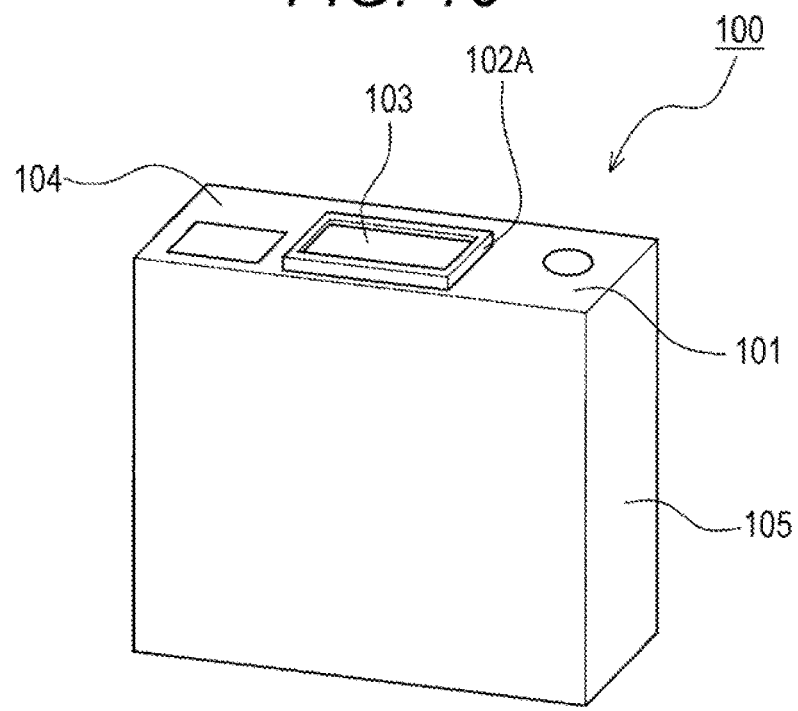
FIG. 16 is a perspective view of a conventional sealed battery.
Figure 17:
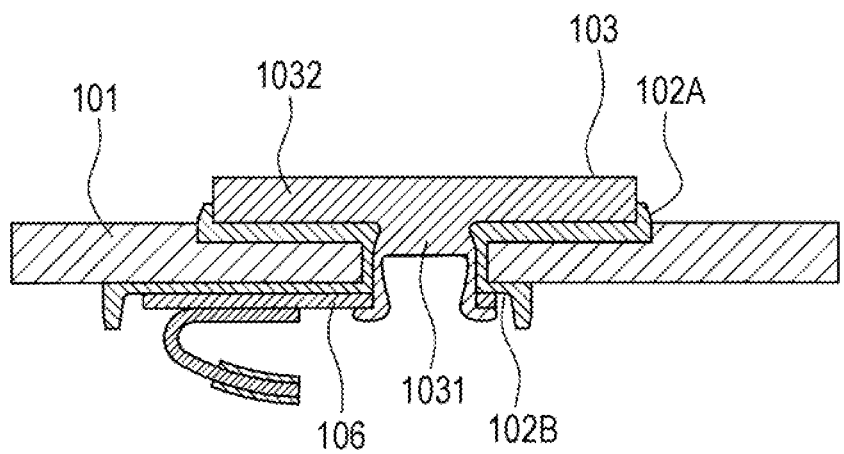
FIG. 17 is an enlarged cross-sectional view of an electrode lead-out pin of the sealed battery and an area around the electrode lead-out pin.
Figure 18:
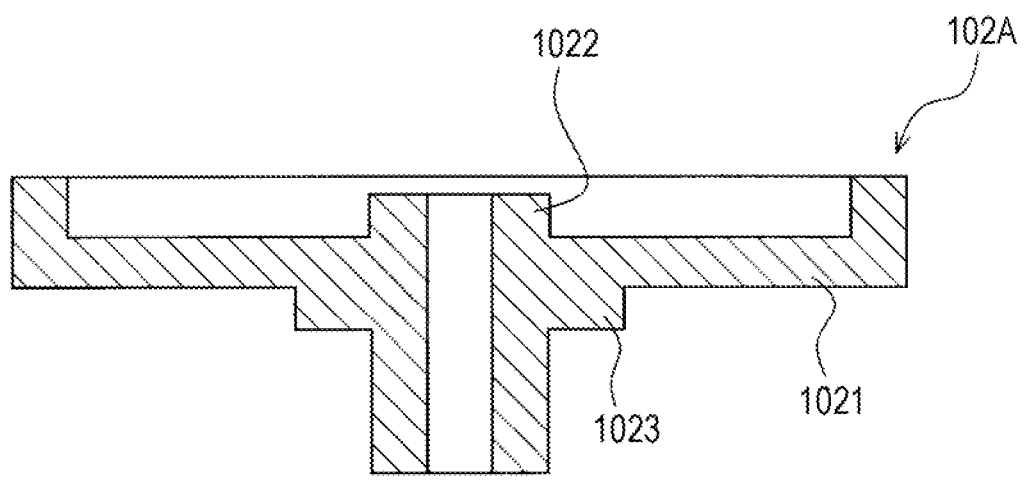
FIG. 18 is an enlarged cross-sectional view of an outer insulating member of the sealed battery.

The energy storage device (for example, battery) 1 may be used in an energy storage apparatus (a battery module when an energy storage device is a battery) 11 shown in FIG. 15. The energy storage apparatus 11 includes at least two energy storage devices 1 and a bus bar member 12 which electrically connects two (different) energy storage devices 1 to each other. In this case, it is sufficient that the technique of the present invention is applied to at least one energy storage device 1.

What is claimed is:

1. An energy storage device comprising:
   a case;
   an external terminal having a head portion disposed outside the case and a shaft portion extending from the head portion and penetrating the case; and
   a gasket having a gasket body disposed at least between the case and the head portion,
   wherein the head portion has a first surface extending along an outer surface of the case and facing the gasket body,
   wherein the gasket has second and third surfaces, the second surface facing the head portion, the third surface facing the case,
   wherein a first projecting portion is disposed between the head portion and the gasket body, the first projecting portion projecting toward the gasket body from the first surface and surrounding the shaft portion, the first projecting portion having a pressing surface which directly or indirectly presses the gasket body in a projecting direction of the first projecting portion,
   wherein a second projecting portion is disposed in a region of at least one of the second and third surfaces which correspond to the first projecting portion,
   wherein, in a state where the gasket body is not compressed by the pressing surface, the second projecting portion is disposed in such a manner that the second projecting portion projects in a direction away from the gasket body and surrounds the shaft portion,
   wherein, in a state where the gasket body is compressed by the pressing surface, the second projecting portion surrounds the shaft portion and is in a state where the second projecting portion is compressed toward the second or third surface by the pressing surface, and
   wherein, in an entire region of the third surface of the gasket which overlaps with the first projecting portion in a stacking direction of the first projection portion on the second surface of the gasket, the outer surface of the case comprises a flat surface that faces the third surface of the gasket.

2. The energy storage device according to claim 1, wherein a distance between the first surface and a surface of the case Which faces the first surface is larger than a thickness of the gasket body in the direction that the shaft portion extends, the gasket body positioned between the first surface and the surface of the case which faces the first surface.

3. The energy storage device according to claim 1, wherein between the first surface and a surface of the case which faces the first surface, a space is formed at least one of between the head portion and the gasket body or between the gasket body and the surface of the case.

4. The energy storage device according to claim 1, wherein between the first surface and the surface of the case which faces the first surface, the head portion and the gasket body are not in contact with each other or the gasket body and the case are not in contact with each other.

5. The energy storage device according to claim 1, wherein the second projecting portion is in a state where the second projecting portion is collapsed by the pressing surface, and
 an area of the second projecting portion as viewed in a direction that the shaft portion extends is smaller than an area of the pressing surface as viewed in the direction that the shaft portion extends.

6. The energy storage device according to claim 1, wherein the second projecting portion is disposed on the second surface and the third surface of the gasket body.

7. The energy storage device according to claim 1, wherein the first projecting portion adjoins the shaft portion.

8. The energy storage device according to claim 7, wherein the head portion and the first projecting portion are integrally formed with each other to construct a terminal head, and
 a thickness of the terminal head where the first projecting portion is formed in the direction that the shaft portion extends is set larger than corresponding thicknesses of other portions of the terminal head.

9. The energy storage device according to claim 7, wherein the case has a recessed portion indented toward an inside of the ease on a peripheral edge portion around a hole through which the shaft portion is made to pass, an outer edge of the recessed portion corresponds to an outer edge of the first projecting portion as viewed from the direction that the shaft portion extends, and
 in the direction that the shaft portion extends, a distance between the pressing surface and a bottom portion of the recessed portion is set smaller than a distance between the first surface and an surface of the case which faces the first surface.

10. An energy storage device comprising:
 a case;
 an external terminal having a head portion disposed outside the case and a shaft portion extending from the head portion and penetrating the case;
 a gasket having a gasket body disposed at least between the ease and the head portion; and
 a current collector connected to an electrode assembly and the external terminal,
 wherein the head portion has a first surface extending along an outer surface of the case and facing the gasket body,
 wherein the gasket has second and third surfaces, the second surface facing the head portion, the third surface facing the case,
 wherein a first projecting portion is disposed between the head portion and the gasket body, the first projecting portion projecting toward the gasket body from the first surface and surrounding the shaft portion, the first projecting portion having a pressing surface which directly or indirectly presses the gasket body in a projecting direction of the first projecting portion,
 wherein a second projecting portion is disposed in a region of at least one of the second and third surfaces which correspond to the first projecting portion,
 wherein, in a state where the gasket body is not compressed by the pressing surface, the second projecting portion is disposed in such a manner that the second projecting portion projects in a direction away from the gasket body and surrounds the shaft portion,
 wherein, in a state where the gasket body is compressed by the pressing surface, the second projecting portion surrounds the shaft portion and is in a state where the second projecting portion is compressed toward the second or third surface by the pressing surface,
 wherein the external terminal has, along an inner surface of the case, a caulked portion extending from the shaft portion, the caulked portion joining together, in the direction that the shaft portion extends, the gasket body and the case in cooperation with the first projecting portion,
 wherein the caulked portion extends to or outward of a position of the second projecting portion as viewed in the direction that the shaft portion extends, and
 wherein, in a stacking direction of the first projecting portion on the second surface of the gasket body, the current collector is disposed between the caulked portion and the gasket body.

11. The energy storage device according to claim 1, wherein a region of the case which corresponds to the first projecting portion is in a state where the region is hardened by working, and
 wherein the gasket body and the second projecting portion are integrally formed with each other.

12. The energy storage device according to claim 10, wherein the gasket body is disposed on an upper surface of the current collector.

13. The energy storage device according to claim 1, wherein the external terminal is made of a material which contains at least one of aluminum, an aluminum alloy, copper and a copper alloy, and
 wherein the gasket is made of a material which contains a polyphenylene sulfide resin or a tetrafluoroethylene perfluoroalkyl vinyl ether copolymer resin.

14. The energy storage device according to claim 10, wherein the first projecting portion is disposed on an upper surface of the gasket body, and
 wherein the external terminal is a unitary piece that includes the first projecting portion and the caulked portion.

15. The energy storage device according to claim 1, wherein the external terminal includes a positive electrode external terminal and a negative electrode external terminal, and as viewed in the direction that the shaft portion extends, an area of the head portion of the negative electrode external terminal is greater than an area of the head portion of the positive electrode external terminal.

16. An energy storage apparatus comprising:
 a plurality of energy storage devices according to claim 1; and
 a bus bar member which electrically connects the energy storage devices to each other.

* * * * *